United States Patent
Sparrow et al.

(10) Patent No.: US 9,169,138 B2
(45) Date of Patent: Oct. 27, 2015

(54) APPARATUS FOR COMPRESSION OF A STACK AND FOR A WATER TREATMENT SYSTEM

(71) Applicant: Saltworks Technologies Inc., Vancouver (CA)

(72) Inventors: Benjamin Stuart Sparrow, Vancouver (CA); Joshua Aniket Zoshi, Vancouver (CA); James Hing Bong Tang, Vancouver (CA); Kyungbaek Kim, Vancouver (CA)

(73) Assignee: SALTWORKS TECHNOLOGIES INC., Vancouver, B.C. (CA)

( * ) Notice: Subject to any disclaimer, the term of this patent is extended or adjusted under 35 U.S.C. 154(b) by 327 days.

(21) Appl. No.: 13/655,216

(22) Filed: Oct. 18, 2012

(65) Prior Publication Data

US 2013/0105325 A1   May 2, 2013

Related U.S. Application Data

(63) Continuation-in-part of application No. 13/205,449, filed on Aug. 8, 2011, now Pat. No. 8,317,992.

(60) Provisional application No. 61/374,614, filed on Aug. 18, 2010, provisional application No. 61/371,676, filed on Aug. 7, 2010.

(51) Int. Cl.
  *C02F 1/469* (2006.01)
  *B01D 61/36* (2006.01)
  (Continued)

(52) U.S. Cl.
  CPC ............ *C02F 1/4693* (2013.01); *B01D 61/368* (2013.01); *B01D 61/50* (2013.01);
  (Continued)

(58) Field of Classification Search
  CPC ...... B01D 61/24–61/30; B01D 63/08–63/088; B01D 65/00; B01D 61/42–61/50; B01D 2313/02; B01D 61/422; C02F 1/4695
  USPC .......................................... 210/227, 228, 229
  See application file for complete search history.

(56) References Cited

U.S. PATENT DOCUMENTS

| 1,344,745 | A | * | 6/1920 | Wells et al. .................... 210/228 |
| 2,741,591 | A | | 4/1956 | Dewey, II et al. |

(Continued)

FOREIGN PATENT DOCUMENTS

| AU | 2011288890 A1 | 2/2013 |
| CA | 2093740 | 1/1994 |

(Continued)

OTHER PUBLICATIONS

International Search Report and Written Opinion dated Dec. 5, 2011 issued by the Canadian Intellectual Property Office for related PCT Patent Application No. PCT/CA2011/000904.

(Continued)

*Primary Examiner* — Keith Hendricks
*Assistant Examiner* — Steven A. Friday
(74) *Attorney, Agent, or Firm* — Troutman Sanders LLP; Ryan A. Schneider; Benjamin C. Wiles

(57) ABSTRACT

The present disclosure is directed at a compression device for compressing a stack to prevent leaks and at an apparatus including the stack and the compression device. The stack includes a pair of rigid end plates located at opposing ends of the stack, a plurality of membrane bounded compartments layered between one of the rigid end plates and the other of the rigid end plates and fluid manifolds extending through the membrane bound compartments. The compression device is fixedly coupled to opposing ends of the pair of rigid end plates and includes compression members movable to compress one of the rigid end plates towards the other of the rigid end plates. The compression members are positioned to apply force to the stack in the vicinity of the fluid manifolds.

12 Claims, 22 Drawing Sheets

(51) Int. Cl.
*B01D 61/50* (2006.01)
*B01D 61/52* (2006.01)
*B01D 63/08* (2006.01)
*B01D 65/00* (2006.01)
*B01J 47/12* (2006.01)
*B01D 61/42* (2006.01)

(52) U.S. Cl.
CPC ............. *B01D 61/52* (2013.01); *B01D 63/084* (2013.01); *B01D 65/00* (2013.01); *B01J 47/12* (2013.01); *B01D 61/422* (2013.01); *B01D 2313/02* (2013.01); *B01D 2313/54* (2013.01); *C02F 2201/007* (2013.01); *C02F 2201/4611* (2013.01)

(56) References Cited

U.S. PATENT DOCUMENTS

| | | | |
|---|---|---|---|
| 3,085,970 A * | 4/1963 | Davis | 204/634 |
| 4,632,745 A | 12/1986 | Giuffrida et al. | |
| 4,728,585 A | 3/1988 | Briggs | |
| 5,292,422 A | 3/1994 | Liang et al. | |
| 5,972,191 A | 10/1999 | Mani | |
| 6,149,810 A | 11/2000 | Gonzalez-Martin et al. | |
| 6,193,869 B1 | 2/2001 | Towe et al. | |
| 6,235,166 B1 | 5/2001 | Towe et al. | |
| 7,326,325 B2 | 2/2008 | Liang et al. | |
| 8,137,522 B2 | 3/2012 | Sparrow et al. | |
| 8,317,992 B2 | 11/2012 | Sparrow et al. | |
| 2002/0148769 A1 | 10/2002 | Deuschle et al. | |
| 2004/0178075 A1 * | 9/2004 | Sato | 204/632 |
| 2008/0105548 A1 | 5/2008 | Liang et al. | |
| 2009/0229990 A1 | 9/2009 | Hinatsu et al. | |
| 2009/0314718 A1 * | 12/2009 | Sparrow et al. | 210/669 |
| 2010/0078317 A1 * | 4/2010 | Bourgeois | 204/258 |

FOREIGN PATENT DOCUMENTS

| | | | |
|---|---|---|---|
| CA | 2523312 | | 11/2004 |
| CA | 2649873 | A1 | 4/2009 |
| CA | 2699174 | | 10/2010 |
| WO | WO 9728889 | A1 * | 8/1997 |
| WO | 2005113450 | A1 | 12/2005 |
| WO | 2006012495 | | 2/2006 |
| WO | 2010006423 | | 1/2010 |

OTHER PUBLICATIONS

Murphy, George W., "Osmionic Demineralization", Industrial and Engineering Chemistry, vol. 50, Issue 8, Aug. 1958, pp. 1181-1188.
Patent Examination Report No. 1 and Search Information Statement issued Feb. 11, 2014 by the Australian IP Office for Patent Application No. 2012241178.
Patent Examination Report No. 1 issued Sep. 24, 2013 by the Australian IP Office for Patent Application No. 2011288890.
Patent Examination Report No. 2 issued Apr. 16, 2014 by the Australian IP Office for Patent Application No. 2011288890.
Office Action issued by Canadian IP Office dated Nov. 21, 2011 for Application No. 2,748,567.
Office Action issued by Canadian IP Office dated Feb. 19, 2013 for Application No. 2,792,516.
Office Action issued by Canadian IP Office dated Aug. 19, 2013 for Application No. 2,792,516.

* cited by examiner

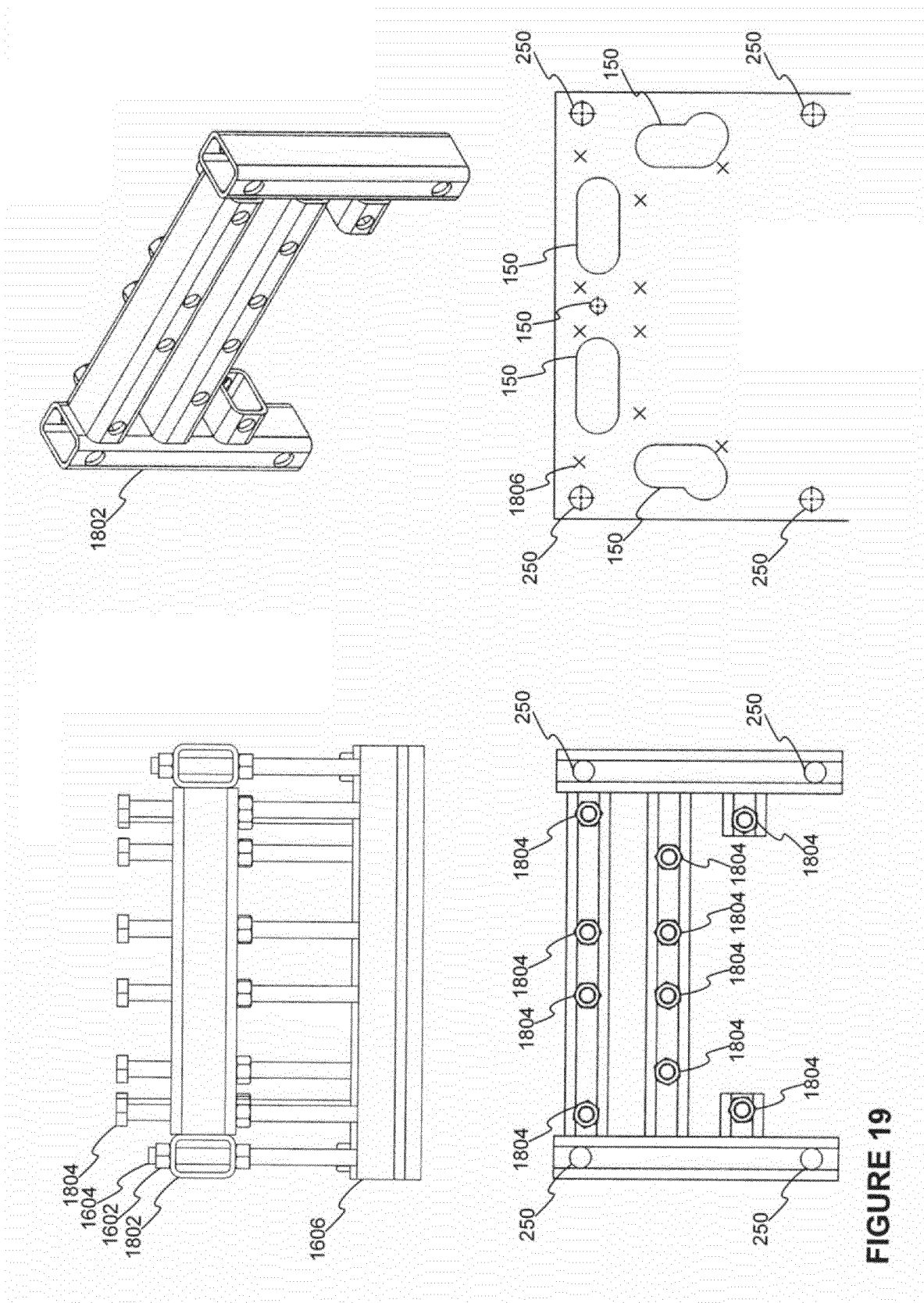

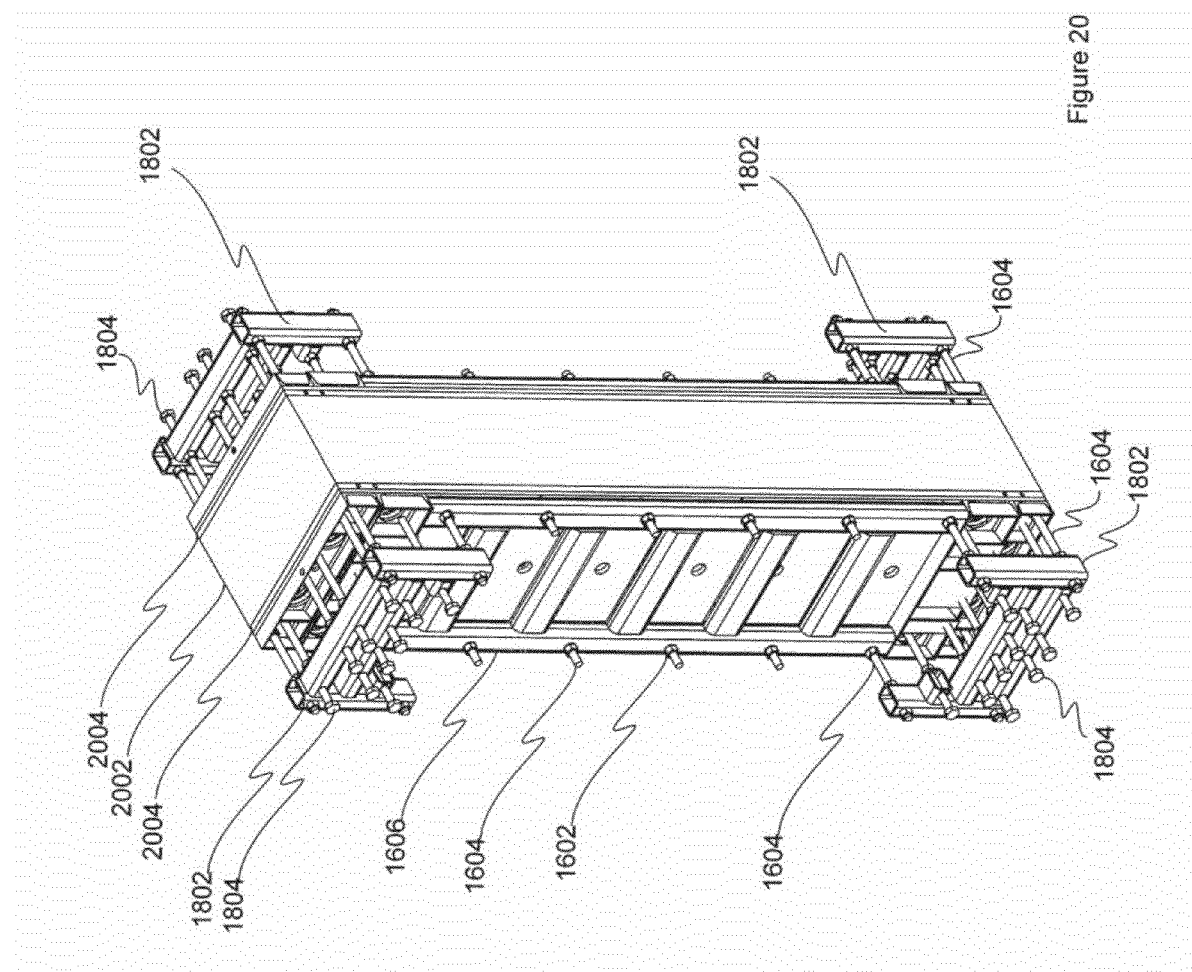

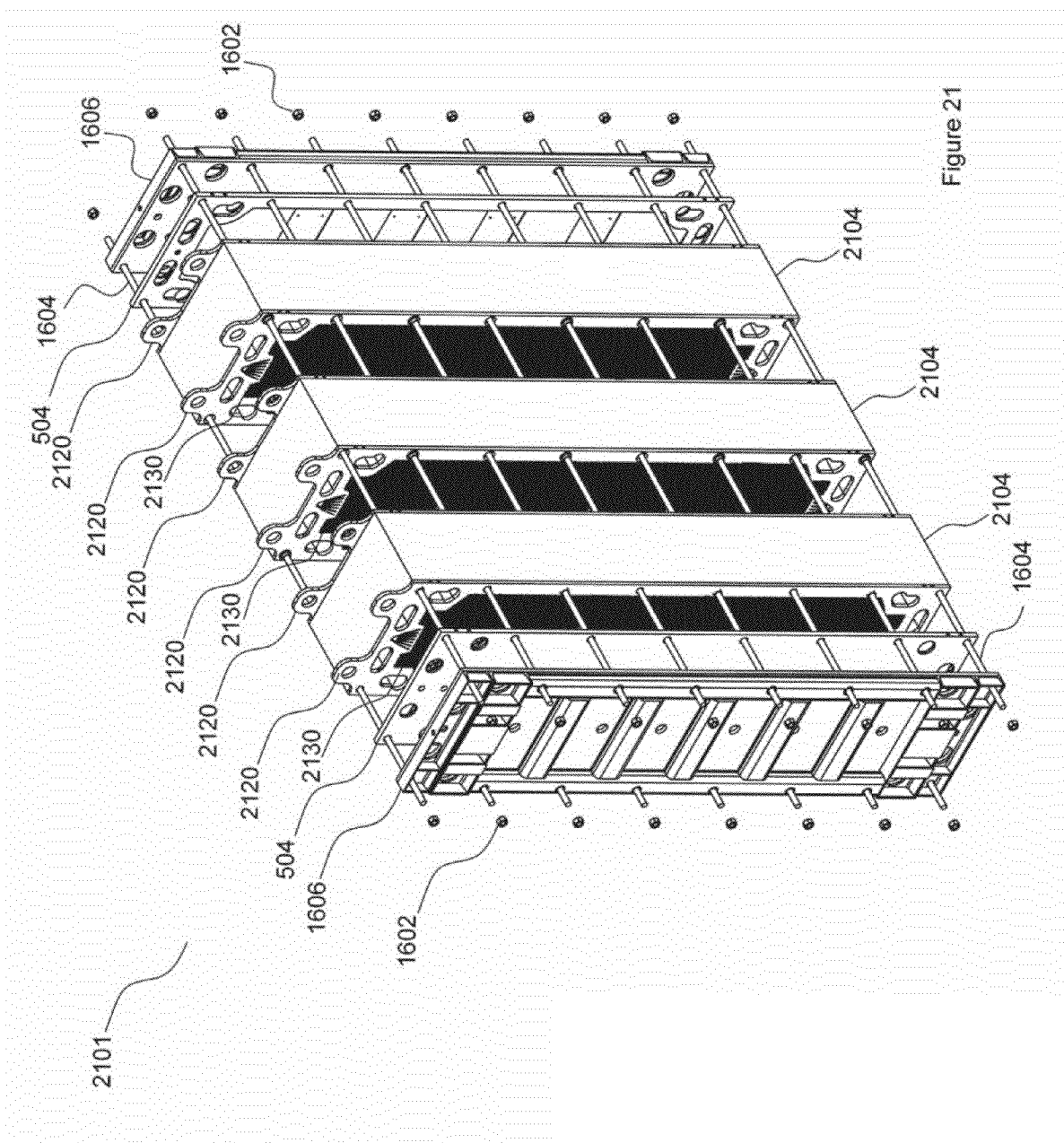

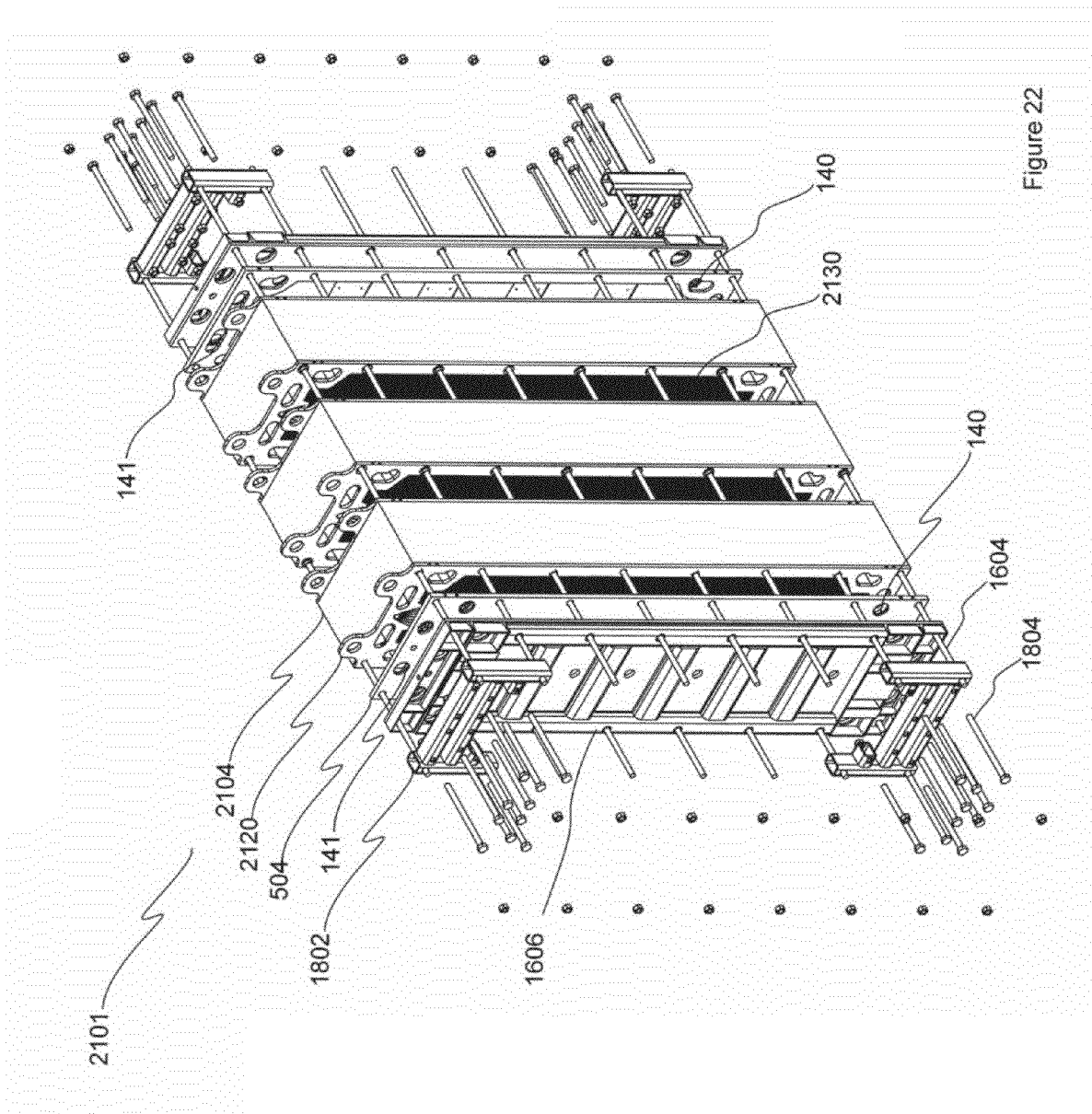

APPARATUS FOR COMPRESSION OF A STACK AND FOR A WATER TREATMENT SYSTEM

CROSS REFERENCE TO RELATED APPLICATIONS

The present application is a continuation-in-part of U.S. patent application Ser. No. 13/205,449, which was filed on Aug. 8, 2011, is pending and is incorporated herein by reference. Pursuant to 35 U.S.C. §119(e), this application claims the benefit of provisional U.S. Patent Application No. 61/374,614, filed Aug. 18, 2010 and entitled "Gasket for a Membrane Dialytic Assembly Stack," and of provisional U.S. Patent Application No. 61/376,676, filed Aug. 7, 2010 and entitled "Packaging of a Concentration Difference Energy Dialytic Device."

TECHNICAL FIELD

The present disclosure is directed at an apparatus including a membrane based stack and a compression device to minimize leaks. The present disclosure is also directed at a modular apparatus for a water treatment system that includes modules having rigid end plates including an electrode to facilitate electrochemical reactions in each module. The present disclosure is further directed at a compression device for a membrane based stack.

BACKGROUND

Over one quarter of Earth's population does not have adequate access to freshwater. Inadequate access to freshwater is detrimental, as it can lead to disease and malnutrition, limit agricultural development, and inhibit economic growth. In contrast to freshwater, saltwater is readily available. Saltwater in the form of seawater constitutes about 97% of the water on Earth. Unless seawater is sufficiently desalinated, though, it is not only undrinkable but unsuitable for agriculture. "Desalination" refers to the process of removing anions and cations from saltwater. Seawater typically has a salt concentration of about 3.5% salt by mass; that is, about 35 grams of dissolved salt per liter of water. Another source of saltwater is salty, underground aquifer water, also known as "brackish water". The salt concentration of brackish water typically ranges from less than 1% to more than 18% salt by mass. In contrast, drinkable water typically has a salt concentration of, at most, about 0.04%. Desalination also has industrial applications; for example, waste saltwater can be desalinated for re-use and to produce a low volume, concentrated brine for disposal.

Given the need for freshwater, and given the abundance of saltwater, including saltwater that is industrial waste, there exists a continued need for methods and systems for producing freshwater by desalinating saltwater.

SUMMARY

According to a first aspect, there is provided an apparatus including a stack and a compression device. The stack includes a pair of rigid end plates located at opposing ends of the stack; a plurality of membrane bounded compartments layered between one of the rigid end plates and the other of the rigid end plates; and fluid manifolds extending through the membrane bounded compartments. The compression device is fixedly coupled to opposing ends of the pair of rigid end plates and includes compression members movable to compress one of the rigid end plates towards the other of the rigid end plates, wherein the compression members are positioned to apply force to the stack in the vicinity of the fluid manifolds.

The apparatus may be used in a saltwater desalinating system or in a water treatment system.

The apparatus may include: a series of holes spaced around the periphery of each of the compression device, the pair of rigid end plates and the plurality of membranes such that when the compression device, the pair of rigid end plates and the plurality of membranes are aligned with each other, the holes align to form conduits extending therethrough; a plurality of tensioning rod having threaded ends and extending through the conduits; and a pair of tensioning rod nuts screwed on to the ends of the tensioning rod to compress the compression device, the pair of rigid end plates and the plurality of membranes together.

A tensioning frame may be positioned between the compression device and the rigid end plates. The tensioning frame includes holes aligned with the holes in the pair of rigid end plates and the tensioning rod also extend through the holes in the tensioning frame and the tensioning rod nuts compress the tensioning frame against the rigid end plates.

An adjustable expansion device may be in communication with one or both of the rigid end plates and adjustable to compress the rigid end plates towards each other.

The compression members may be bolts that can be screwed into and out of struts in the compression device.

According to another aspect, there is provided an apparatus for water treatment system including a plurality of internal modules compressively coupled to each other. The internal modules includes a pair of rigid interior end plates located at opposing ends of the internal module; an electrolyte compartment bounding an internal surface of each of the rigid interior end plates; and a stack of membrane bounded compartments layered from one of the electrolyte compartments to the other of the electrolyte compartments. Each of the rigid interior end plates includes an electrode. The electrode of one of the rigid interior end plates is electrically connected to the electrode of the other of the rigid interior end plates to complete an ionic circuit through the internal module.

The internal modules may further include fluid manifolds extending from one of the interior end plates to the other of the interior end plates. The apparatus may further include: a pair of external end plates located on opposing ends of the plurality of internal modules; and a compression device fixedly coupled to the external end plates and including compression members movable to compress one of the external end plates towards the other of the external end plates. The compression members are positioned to apply force to the internal modules in the vicinity of the manifolds.

The stack of membrane bounded compartments may include alternating membranes and gasket separators. The apparatus may further include: a series of dowel holes spaced around the periphery of each of the gasket separators, membranes, electrolyte compartments, and interior end plates of the internal modules such that when the gasket separators, membranes, electrolyte compartments, and interior end plates are aligned with each other, the dowel holes align to form dowel conduits extending between the opposing ends of the internal module; and dowels extending through the dowel conduits.

For an adjacent pair of the internal modules, the dowels may extend through one subset of the dowel conduits of one of the internal modules of the adjacent pair, and additional dowels extend through a complementary subset of the dowel conduits of the other of the internal modules of the adjacent pair such that when the internal modules are compressed, the dowels in one of the internal modules of the adjacent pair slide into empty dowel holes in the other of the internal modules of the adjacent pair.

The dowels may be threaded. The apparatus may further include a pair of dowel nuts screwed on to the ends of each of the dowels to maintain compression of the internal modules.

The interior end plates of the internal modules may further include a recess shaped and positioned to receive one of the dowel nuts used to compress an adjacent one of the internal modules.

The dowels may be hollow, and the external end plates and compression device may include dowel holes aligned with the dowel holes in the internal modules. The apparatus may further include: a tensioning rod having threaded ends and extending through the dowel holes and through the dowels; and a pair of tensioning rod nuts screwed on to the ends of the tensioning rod to compress the internal modules.

The apparatus may further include a tensioning frame positioned between the compression device and the external end plates and overlapping the dowel holes in the external end plates. The tensioning frame may include dowel holes aligned with the dowel holes in the external end plates and the tensioning rod extends through the dowel holes in the tensioning frame and the tensioning rod nuts compress the tensioning frame against the external end plates.

The fluid manifolds may pass through the gasket separators and may be fluidly coupled to the compartments by an inlet notch in one side of the gasket separators that is shaped to direct fluid flowing from the manifolds into the compartments towards at least one of an opposing side of the gasket separators. The notch in one of the compartments may not overlap the notch in an adjacent one of the compartments.

The apparatus may further include a mesh located within each of and coplanar with the gasket separators. The mesh may include a relatively thick portion within the notch to mitigate against leakage from an adjacent one of the gasket separators.

A portion of the gasket separator neighbouring the notch may be relatively thick to compress a membrane located between the notch and the gasket separator adjacent to the notch into the notch to mitigate against leakage from the gasket separator adjacent to the notch.

The apparatus may further include a modular container in which the modules are disposed, wherein the modular container includes support tracks lining its interior and the modules are mounted on the support tracks.

The apparatus may further include a blank module including an interior end plate fluidly coupled between interior end plates of adjacent modules.

According to a further aspect, there is provided a compression device including: a frame operably fixedly coupled to an end plate of the stack; and a plurality of compression members moveably connected to the frame and operable to be moved towards and away from the end plate. The compression members are positioned to apply compressive force to the stack in the vicinity of fluid manifolds extending through the stack when the compression members are moved towards the end plate.

The compression members may be bolts that can be screwed into and out of struts in the frame.

The compression device may be used with a membrane based stack for a saltwater desalination system or a water treatment system.

According to a further aspect, there is provided an apparatus for a saltwater desalinating system. The apparatus includes a plurality of internal modules compressively coupled to each other, wherein each of the internal modules comprises a pair of rigid interior end plates located at opposing ends of the internal module; and a stack of membrane bounded compartments layered from one of the interior end plates to the other of the interior end plates.

The stack of membrane bounded compartments may include alternating membranes and gasket separators, and the apparatus may also include a series of dowel holes spaced around the periphery of each of the gasket separators, membranes and end plates of the internal modules such that when the gasket separators, membranes, and end plates are aligned with each other, the dowel holes align to form dowel conduits extending between the opposing ends of the internal module.

For an adjacent pair of the internal modules, the apparatus may also include dowels extending through one subset of the dowel holes of one of the internal modules of the adjacent pair, and additional dowels extending through a complementary subset of the dowel holes of the other of the internal modules of the adjacent pair such that when the internal modules are compressed, the dowels in one of the internal modules of the adjacent pair slide into empty dowel holes in the other of the internal modules of the adjacent pair.

The dowels may be threaded, and the apparatus may also include a pair of dowel nuts screwed on to the ends of each of the dowels to maintain compression of the internal modules.

The interior end plates of the internal modules may also include a recess shaped and positioned to receive one of the dowel nuts used to compress an adjacent one of the internal modules.

A pair of end modules may be located on opposing ends of the plurality of internal modules, with each of the end modules including a rigid exterior end plate; a rigid interior end plate fluidly coupled to the rigid interior end plate of the internal module that is adjacent to the end module; a completion compartment located between the exterior and interior end plates; and a membrane located between and bounding both the interior end plate and the completion compartment.

A pair of adjustable expansion devices may be located on opposing ends of the end modules and adjustable to compress the exterior end plates towards each other.

Each of the end modules may include an electrolyte inlet port fluidly coupled to the completion compartment; an electrolyte outlet port fluidly coupled to the completion compartment; and an electrode fluidly coupled to the completion compartment, wherein the electrodes on the pair of end modules are electrically coupled to each other.

Each of the end modules may also include a completion gasket separator circumscribing the completion compartment. If the completion gasket separator includes the completion compartment, the apparatus may also have a series of dowel holes spaced around the periphery of each of the completion gasket separator, membrane, and end plates of the end modules such that when the completion gasket separator, membrane, and end plates are aligned with each other, the dowel holes align to form dowel conduits extending between opposing ends of the end module. The dowel holes of the end modules may align with the dowel holes of the internal modules when the internal and end modules are aligned.

The dowels may be hollow and the apparatus may also include a tensioning rod having threaded ends and extending through the dowel holes and through the dowels; and a pair of tensioning rod nuts screwed on to the ends of the tensioning rod to compress the internal and end modules.

The apparatus may also include a tensioning frame positioned against opposing ends of the pair of end modules and overlapping the dowel holes in the exterior end plates of the end modules. Dowel holes in the tensioning frame may be aligned with the dowel holes in the exterior end plates of the end modules, the tensioning rod may extend through the dowel holes in the tensioning frame, the tensioning rod nuts may compress the tensioning frame against the end modules.

The periphery of the gasket separators may include fluid manifolds extending from one of the end plates to the other of the end plates in each of the internal and end modules, and the apparatus may also include a compression device fixedly coupled to the tensioning frame and having compression members movable to compress one of the end modules towards the other of the end modules. The compression members can be positioned to apply force to the modules in the vicinity of the manifolds.

The compartments circumscribed by the gasket separators may be rectangular, and the fluid manifolds passing through the gasket separators may be fluidly coupled to the compartments by an inlet notch in one of the short sides of the gasket separators that is shaped to direct fluid flowing from the manifolds into the compartments towards at least one of the long sides of the gasket separators.

The notch in one of the compartments may be positioned so as not to overlap the notch in an adjacent one of the compartments.

The apparatus may also include a mesh located within each of and that is coplanar with the gasket separators. The mesh has a relatively thick portion within the notch to mitigate against leakage from an adjacent one of the gasket separators.

A portion of the gasket separator neighbouring the notch may be relatively thick to compress a membrane located between the notch and the gasket separator adjacent to the notch into the notch to mitigate against leakage from the gasket separator adjacent to the notch.

The apparatus may be located within modular container, such as a shipping container. The modular container may have support tracks lining its interior and the modules may be mounted on the support tracks.

The apparatus may also include a blank module having an interior end plate fluidly coupled between interior end plates of adjacent modules.

The alternating membranes and gasket separators may include a drive cell configured to generate a drive voltage using concentration difference energy; and a product cell. The product cell can include a product feed compartment; and an anion exchange membrane and a cation exchange membrane located on opposing sides of the product feed compartment such that when a sufficient voltage that equals or exceeds a desalination voltage and that comprises the drive voltage is applied to the product feed compartment, anions and cations contained within saltwater in the product feed compartment are driven out of the product feed compartment through the anion and cation exchange membranes, respectively. The drive cell, product cell, and end plate compartments can be ionically communicatively coupled with each other.

According to another aspect, there is provided a method for desalinating saltwater. The method includes generating a drive voltage using a drive cell; and applying the drive voltage to a product cell. The product cell includes a product feed compartment; and an anion exchange membrane and a cation exchange membrane located on opposing sides of the product feed compartment such that when a sufficient voltage that equals or exceeds a desalination voltage and that comprises the drive voltage is applied to the product feed compartment, anions and cations contained within saltwater in the product feed compartment are driven out of the product feed compartment through the anion and cation exchange membranes, respectively. The drive and product cells are contained within a plurality of internal modules wherein each of the internal modules comprises a pair of rigid interior end plates located at opposing ends of the internal module and wherein adjacent interior end plates are fluidly coupled together to form end plate compartments.

A pair of end modules may be located on opposing ends of the plurality of internal modules, with each of the end modules having a rigid exterior end plate; a rigid interior end plate fluidly coupled to the rigid interior end plate of the internal module that is adjacent to the end module; a completion compartment located between the exterior and interior end plates; and a membrane located between and bounding both the interior end plate and the completion compartment.

The exterior end plates may be compressed towards each other.

The method may also include electrically coupling the completion compartments together; and pumping an electrolyte through the completion compartments.

The drive cell may also include ion exchange membranes and alternating gasket separators that circumscribe compartments, the product feed compartment may also include a gasket separator that circumscribes the product feed compartment, and each of the internal modules may also include a series of dowel holes spaced around the periphery of each of the gasket separators, membranes and end plates of the internal modules such that when the gasket separators, membranes, and end plates are aligned with each other, the dowel holes align to form dowel conduits extending between the opposing ends of the internal module.

Each of the end modules may include a completion gasket separator circumscribing the completion compartment and an ion exchange membrane fluidly coupled to the completion compartment, and a series of dowel holes spaced around the periphery of each of the completion gasket separator, ion exchange membrane and end plates of the external modules such that when the completion gasket separator, membrane, and end plates are aligned with each other, the dowel holes align to form dowel conduits extending between opposing ends of the external module. The dowel holes of the external modules may align with the dowel holes of the internal modules when the internal and external modules are aligned.

For an adjacent pair of the internal modules, the method may also include extending dowels through one subset of the dowel holes of one of the internal modules of the adjacent pair; and extending additional dowels through a complementary subset of the dowel holes of the other of the internal modules of the adjacent pair such that when the modules are compressed, the dowels in one of the internal modules of the adjacent pair slide into empty dowel holes in the other of the internal modules of the adjacent pair.

The dowels may be threaded, and the method may also include compressing the internal modules, and maintaining compression of the internal modules by screwing a pair of dowel nuts on to the ends of the dowels.

The interior end plates of the internal modules may have a recess shaped and positioned to receive one of the dowel nuts used to compress an adjacent one of the internal modules.

The dowels may be hollow, and the method may also include compressing the internal and end modules by extending a tensioning rod having threaded ends through the dowel holes and through the dowels; and screwing a pair of tensioning nuts on to the ends of the tensioning rod.

A tensioning frame may be positioned against opposing ends of the pair of end modules and may overlap the dowel holes in the exterior end plates of the end modules. The tensioning frame may include dowel holes aligned with the dowel holes in the exterior end plates of the end modules, the tensioning rod may extend through the dowel holes in the tensioning frame, and the tensioning rod nuts may compress the tensioning frame against the end modules.

The periphery of the gasket separators may have fluid manifolds extending from one of the end plates to the other of the end plates in each of the internal and external modules, and the method may also include applying supplementary compression to the tensioning frame by pushing compression members into the end modules to apply force to the modules in the vicinity of the manifolds.

The compartments circumscribed by the gasket separators may be rectangular, and the fluid manifolds passing through the gasket separators may be fluidly coupled to the compartments by an inlet notch in one of the short sides of the gasket separators that is shaped to direct fluid flowing from the manifolds into the compartments towards the long side of the gasket separators farthest from the notch.

The mesh may located within each of and may be coplanar with the gasket separators, and may include a relatively thick portion within the notch to mitigate against leakage from an adjacent one of the gasket separators.

A portion of the gasket separator neighbouring the notch may be relatively thick to compress a membrane located between the notch and the gasket separator adjacent to the notch into the notch to mitigate against leakage from the gasket separator adjacent to the notch.

The notch in one of the compartments may be positioned so as not to overlap the notch in an adjacent one of the compartments.

The method may include mounting the modules on to support tracks located within a modular container.

The method may also include replacing one of the internal modules with a blank module comprising an interior end plate fluidly coupled between interior end plates of adjacent modules; and flowing an ionic solution through the blank module.

According to another aspect, there is provided a method for making a gasket separator. The method includes providing a gasket border material having a certain thickness; providing a mesh having a thickness that is about 2% to 5% thinner than the gasket border material; overlaying the mesh and the gasket border material; and bonding the gasket border material and the mesh together by melting one of the gasket border material or mesh into the other.

The gasket border material may have a durometer from about Shore A20 to Shore A60. The gasket separator may include ethylene-vinyl acetate. The mesh may include polypropylene. The gasket separator may have a lower melting temperature than the mesh.

BRIEF DESCRIPTION OF THE DRAWINGS

In the accompanying drawings, which illustrate one or more exemplary embodiments:

FIG. 19, shows various views of the compression device of FIG. 18 and a schematic representation of the exterior end plate of the end module showing load application points of the compression device.

FIG. 20 shows the compression device of FIGS. 18 and 19 mounting on to a non-modular stack, according to another embodiment;

FIG. 21 shows an exploded view of another embodiment of a modular stack composed of internal modules with electrodes positions at either end of each of the internal modules;

FIG. 22, shows an exploded view of the compression device of FIGS. 18 and 19 mounted on to the stack of FIG. 21.

DETAILED DESCRIPTION

Figure 1:
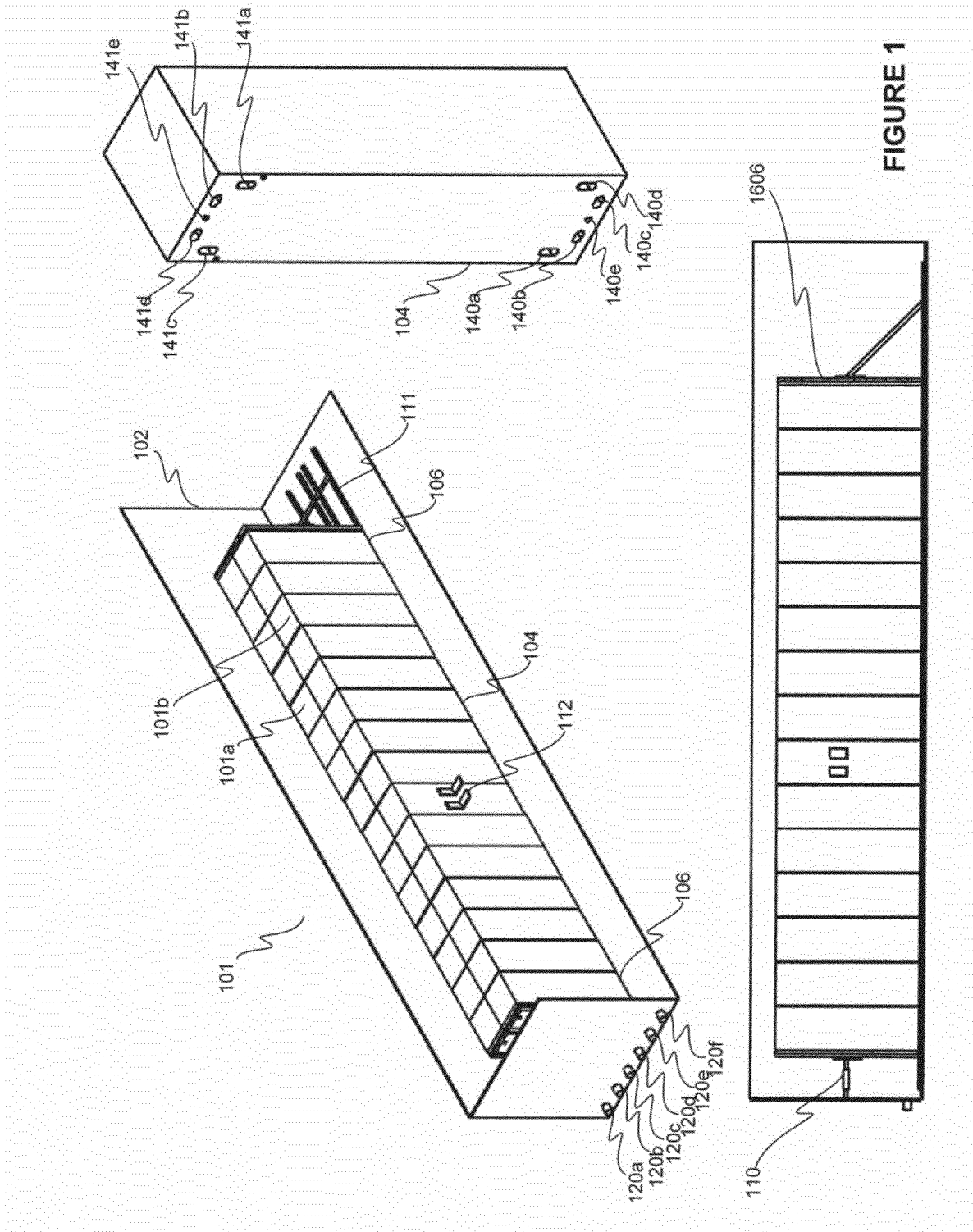
FIG. 1 shows partial cutaway views of a stack composed of internal and end modules according to one embodiment, and a perspective view of one of the internal modules showing the manifolds used to transport fluids into and out of the module.

Directional terms such as "top," "bottom," "upwards," "downwards," "vertically" and "laterally" are used in the following description for the purpose of providing relative reference only, and are not intended to suggest any limitations on how any article is to be positioned during use, or to be mounted in an assembly or relative to an environment.

Several types of desalination systems can utilize permeable membranes of some sort; these types of desalination systems are hereinafter collectively referred to as "membrane based desalination systems". For example, desalination systems that rely on concentration difference energy ("CDE") utilize ion exchange membranes in the form of anion and cation exchange membranes, which are respectively anion and cation permeable, but which do not allow water to pass through them. Descriptions of CDE systems can be found in published patent applications WO 2011/050473 (serial no. PCT/CA2010/001718) entitled "Method and System for Desalinating Saltwater While Generating Electricity", WO 2010/

115287 (serial no. PCT/CA2010/000537) entitled "Method and System for Desalinating Saltwater Using Concentration Difference Energy", and WO 2009/155683 (serial no. PCT/CA2009/000080) entitled "Method and System for Desalinating Saltwater Using Concentration Difference Energy", the entireties of each of which are hereby incorporated by reference herein.

Another type of membrane based desalination system is a system that relies on electrodialysis reversal ("EDR") technology. EDR systems utilize ion permeable membranes that are similar to those used in CDE systems. Similarly, membrane distillation ("MD") desalination systems utilize hydrophobic membranes that reject liquid water but are permeable to water vapour to effect desalination. Vapour transfer is typically driven by a vapour pressure gradient between a warmer saline compartment and a cooler, less saline compartment.

These membrane based desalination systems are often assembled in stacks. These stacks may, for example, take the form of layers of membrane bounded compartments. The membrane bounded compartments are constructed from alternating layers of gasket separators and membranes. The gasket separators circumscribe the compartments in which fluids, including both liquids and gases, can flow and come into contact with the membranes, which sandwich the compartments, during desalination. In CDE systems, for example, the compartments can include product feed compartments though which the saltwater to be desalinated flows, and concentrate and diluent compartments through which flows solutions of different ionic concentrations used to generate a drive voltage.

The rate at which such membrane based desalination systems can desalinate is directly proportional to the area of the membranes present in the stacks. One way to increase membrane area is to construct longer stacks having more membranes. However, technical problems are associated with constructing such stacks. Two such problems are sealing the compartments to prevent leakage and buckling. As a longer stack is built, any gap through which leakage can occur between one of the gasket separators and the membranes that sandwich it is effectively amplified by the number of compartments present in the stack. Ideally, within the stack the surfaces of any given one of the gasket separators and its adjacent membranes are flush with each other such that there is no gap between the surfaces through which leakage can occur. However, in practice, such gaps are often present. For example, if the gasket separators and membranes are shaped such that between the surfaces of each gasket separator and membrane pair there is a 0.03 mm gap prior to being integrated into the stack, for a stack having 100 compartments constructed using such separators and membranes there could be a 3 mm gap at one end of the stack. Significant leakage could occur through this gap. In order to eliminate these gaps and seal long stacks, the amount of compression force that is applied to the stack to prevent leakage from occurring along the interfaces between the gasket separators and the membranes is accordingly increased. Eventually, the amount of force that is applied to prevent leakage causes the stack to substantially buckle, which can structurally damage the stack as well as, ironically, increase the stack's rate of leakage. Even if buckling can be prevented, the amount of force that is applied to the stack to prevent leakage increases as the stack increases in length. Eventually, the amount of force exceeds the compressive strength of the membranes, and the membranes can fail mechanically.

The embodiments discussed herein are directed at a modular stack that includes internal and end modules. The end modules are located at opposing ends of the stack, and the internal modules are located between the end modules. Each of the end and internal modules includes rigid end plates that are used to periodically zero any gaps within the stack between the gasket separators and membranes. The rigid end plates also facilitate alignment of the gasket separators and membranes and help to structurally stabilize the stack. In addition to the entire stack being compressed, each of the modules is also individually compressed and fluidly sealed using a lower compressive force than would be used if there were no individual module compression. This allows the amount of compressive force that any one of the modules experiences to be less than the compressive strength of the membranes, thereby preventing the membranes from mechanically failing. In addition, dividing the stack into modules simplifies stack assembly and handling. For example, instead of constructing one 300 cm stack all at once, ten smaller 30 cm stacks can be constructed in the form of the modules and the 300 cm stack can be then be more easily assembled incrementally by using the modules.

The embodiments that follow are directed at a stack used in a CDE system. However, as mentioned above, in alternative embodiments (not depicted), the stacks may be used for alternative forms of membrane based desalination, such as EDR and MD systems.

Referring now to FIG. 1, there is shown a CDE dialytic stack assembly 101 according to one embodiment. The CDE dialytic stack assembly 101 is packaged into a shipping container 102 that provides protection from the environment and that acts as a protective outer shell. Exemplary shipping containers include intermodal containers conforming to International Organization for Standards' specifications and measuring roughly eight feet by eight feet by forty feet, but could also include other modules suited for low cost production and handling by existing transportation infrastructure. The CDE dialytic stack assembly 101 is constructed from two adjacent stacks 101a,b of 15 modules each; the 15 modules are manufactured using 13 internal modules 104 compressed between two end modules 106. The modules 104, 106 are compressed by a rigid tensioning frame 1606 and an adjustable expansion device 110. The tensioning frame 1606 is discussed in more detail with respect to FIG. 16, below. The adjustable expansion device 110 can include, for example, bolt jacks, hydraulic jacks, turn buckles, or another suitable device that can be used to apply compressive force to the stack assembly 101. The internal modules 104 and end modules 106 are mounted on support tracks 111 lining the bottom interior side of the container 102; the support tracks 111 may include, for example, bearing surfaces to enable simplified installation and removal of the modules 104, 106 into and out of the container 102 while also maintaining longitudinal alignment of the modules 104, 106. As depicted in FIG. 1, the internal modules 104 and end modules 106 may also be restrained from moving laterally within the container 102 by using lateral restraints 112 extending laterally from the modules 104, 106. The lateral restraints 112 may be, for example, rigid members fastened to the container 102 wall and preventing lateral movement of any single one of the modules 104, 106.

The ionic solutions used to operate the CDE dialytic stack assembly 101 are provided to the modules 104, 106 via a manifolds system that includes fluid conduits extending through the sides of the container 102 and that is fluidly coupled to the modules 104, 106, as summarized below:

product feed manifold 120a: the product feed manifold 120a transports the product feed to the stack assembly 101 for desalination. The product feed is the saltwater that is to be desalinated.

diluent_p manifold 120c: the diluent_p manifold 120c transports saltwater ("diluent_p") higher in concentration than the product feed and lower in concentration than the concentrate to the stack assembly 101. In one embodiment, the ions that exit the product feed during desalination migrate to the diluent_p prior to being discharged from the stack assembly 101.

diluent_c manifold 120d: the diluent_c manifold 120d transports saltwater ("diluent_c") higher in concentration than the product feed and lower in concentration than the concentrate to the stack assembly 101. The diluent_c is typically higher in concentration than the diluent_p and is used to generate a drive voltage that effects desalination.

concentrate manifold 120b: the concentrate manifold 120b transports the saltwater ("concentrate") highest in concentration to the stack assembly 101. In conjunction with the diluent_c, the concentrate is used to generate the drive voltage.

module ion transfer fluid manifold 120e: the module ion transfer fluid manifold 120e transports the solution ("module ion transfer fluid") that is used to maintain ionic conductivity between adjacent modules 104, 106, as discussed in greater detail below. Typically, the module ion transfer fluid is identical to the concentrate and is drawn from the same reservoir.

end module manifold 120f: in embodiments in which the ionic reactions in the stack assembly 101 are completed electrochemically, the end module manifold 120f transports electrolytes used for electrochemical completion to the end modules 106. In embodiments in which electrochemical completion is not used and instead completion is performed ionically, the end module manifolds 120f may be used to pump the concentrate or module ion transfer fluid from one of the end modules 106 to the other.

(collectively, the manifolds 120a-f is hereinafter the "stack manifolds 120").

In the depicted embodiment, saltwater of varying ionic concentrations is used as concentrate, module ion transfer fluid, diluent_p, and diluent_c.

Plumbing (not shown) transports the fluids conveyed using the stack manifolds 120 to one of the end modules 106 where it then enters module inlet manifolds 140a-e (collectively, "module inlet manifolds 140") as depicted in FIG. 1. As discussed in further detail below, the module inlet manifolds 140 convey the solutions through the stack assembly 101 by travelling first through one of the end modules 106, then through all of the internal modules 104, and then through the other of the end modules 106. Once the fluids exit the other of the end modules 106, they exit the shipping container via additional manifolds (not shown) analogous to that of the stack manifolds 120 shown in FIG. 1.

In FIG. 1, one of the internal modules 104 is shown in isolation. Extending through the periphery of the internal module 104 is module inlet manifolds 140a-e located at the bottom of the internal module 104 shown in FIG. 1, and module outlet manifolds 141a-e (collectively, "module outlet manifolds 141") located at the top of the internal module 104 shown in FIG. 1. Both types of manifolds 140a-e, 141a-e extend from end-to-end within the internal module 104; by "end-to-end", it is meant from the internal module 104 adjacent to one of the end modules 106 to the internal module 104 adjacent to the other of the end modules 106 in any given one of the stacks 101a,b. As discussed in further detail below, similar manifolds exists in the end modules 106 as well. The product feed manifold 120a is fluidly coupled to a product feed module inlet manifold 140a; the diluent_p manifold 120c is fluidly coupled to a diluent_p module inlet manifold 140c; the diluent_c manifold 120d is fluidly coupled to a diluent_c module inlet manifold 140d; the concentrate manifold 120b is fluidly coupled to a concentrate module inlet manifold 140b; and the module ion transfer fluid manifold 120e is fluidly coupled to a module ion transfer fluid inlet manifold 140e. As discussed in further detail below, the solutions entering the modules 104, 106 flow from the module inlet manifolds 140 located at the bottom of the modules 104, 106, through inlet notches (described below) into the compartment circumscribed by the gasket, and then through outlet notches (described below) to the module outlet manifolds 141 located at the top of the modules 104, 106. Product feed exits the modules 104, 106 via a product feed module outlet manifold 141a; diluent_p exits via a diluent_p module outlet manifold 141c; diluent_c exits via a diluent_c module outlet manifold 141d; concentrate exits via a concentrate outlet manifold 141b; and module ion transfer fluid exits via a module transfer fluid outlet manifold 141e.

The CDE dialytic stack assembly 101 may be operated in forward polarity for a set period of time, and then reverse polarity for a set period of time, in order to de-scale membranes while maintaining production.

Figure 2:
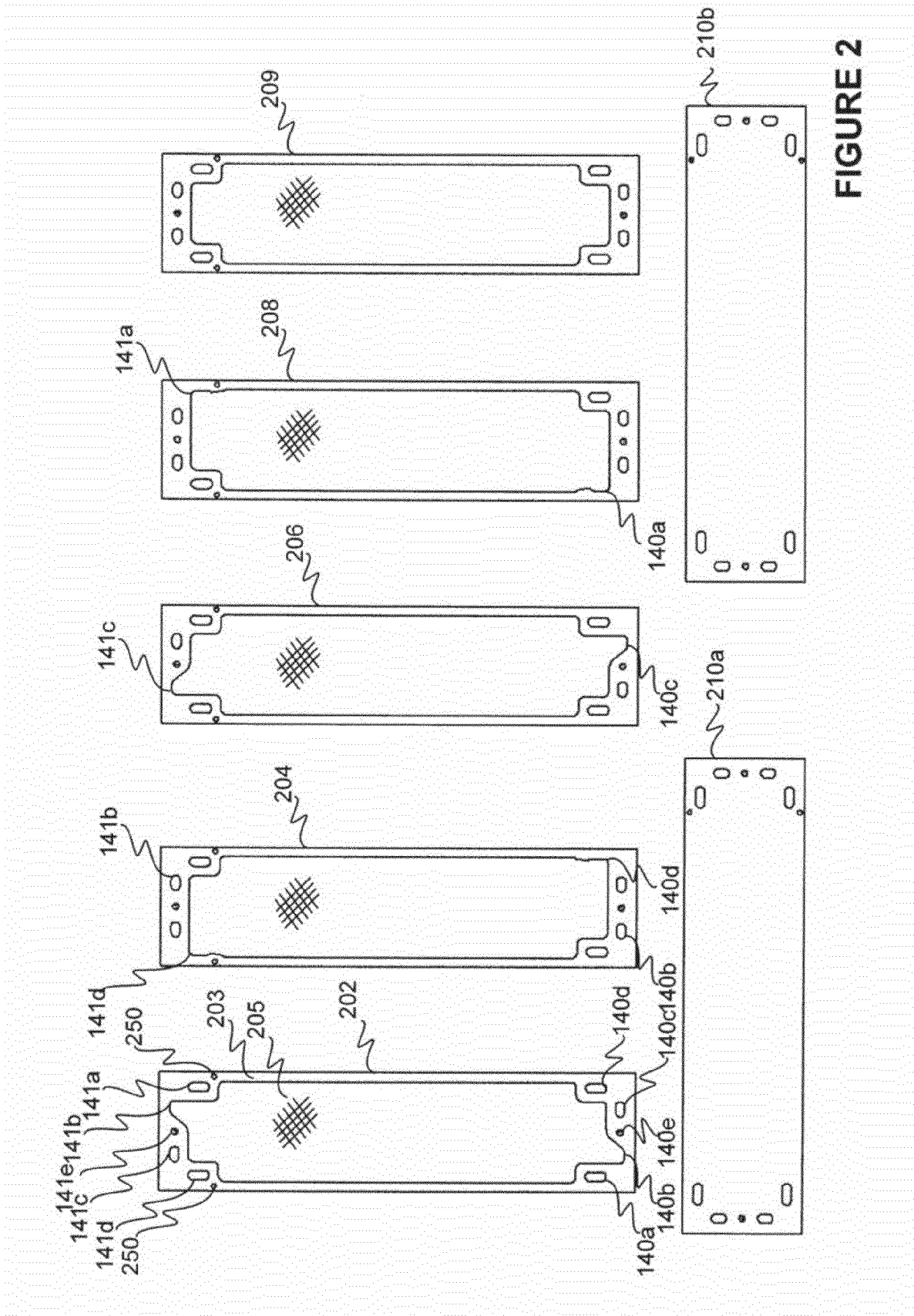
FIG. 2 shows front elevation views of various types of gasket separators and ion exchange membranes that can be used in the stack of FIG. 1.

Referring now to FIG. 2, there are depicted the various gasket separators and ion exchange membranes that are incorporated into the internal and external modules 104, 106. Each of gasket separators 202, 204, 206, 208 is shaped to fluidly couple one of the module inlet manifolds 140 with one of the module outlet manifolds 141. A concentrate gasket separator 202 that circumscribes a concentrate compartment is fluidly coupled to the concentrate module inlet and outlet manifolds 140b, 141b via notches in the periphery of the gasket separator 202. Similarly, a diluent_c gasket separator 204 circumscribes a diluent_c compartment and is fluidly coupled to the diluent_c module inlet and outlet manifolds 140d, 141d; a diluent_p gasket separator 206 circumscribes a diluent_p compartment and is fluidly coupled to the diluent_p module inlet and outlet manifolds 140c, 141c; and a product feed gasket separator 208 circumscribes a product feed compartment and is fluidly coupled to the product feed module inlet and outlet manifolds 140a, 141a. Also shown in FIG. 2 are a cation exchange membrane 210a and an anion exchange membrane 210b (generically, "ion exchange membrane 210"), which are structurally identical to each other but which may differ in terms of membrane electrochemical or mass transfer properties. As discussed in further detail below with respect to FIG. 5, completion compartment gasket separators 209 shown in FIG. 2 circumscribe completion compartments into which an electrolyte is directly pumped for ionic completion. Although in the present embodiment electrolyte is pumped directly into the completion compartments, in an alternative embodiment (not shown) electrolyte can be conveyed into the completion compartment using manifolds in an analogous manner as for the concentrate, diluent_c, diluent_p, and product feed compartments.

The internal and external modules 104, 106 include an alternating stack of the gasket separators 202, 204, 206, 208 and the cation and anion exchange membranes 210a, 210b. The gasket separators 202, 204, 206, 208 enable separation and sealing against the anion exchange membrane 210b on one side and the cation exchange membrane 210a on the other side via a gasket edge 203 and separator mesh 205. The separator mesh 205 allows for fluid passage within the compartment from the inlet manifolds 140 to the outlet manifolds 141. When multiple gasket separators and membranes are stacked, the internal module inlet manifolds 140 and the internal module outlet manifolds 141 are formed as described in reference to FIG. 3, below. Additionally, as discussed in more detail with respect to FIGS. 12 to 16, below, a series of dowels can be inserted through dowel holes 250 in the periphery of the gasket separators 202, 204, 206, 208, 209 and the ion exchange membranes 210 to align the separators and membranes as well as to restrain them from lateral movement. Although a pair of dowel holes 250 are shown in FIG. 2, in alternative embodiments depicted in FIGS. 12 to 16 a series of peripherally spaced dowel holes are present in the periphery of the separators and membranes.

The stack assembly 101 that is formed from the internal and end modules 104, 106 can be operated in forward or reverse polarity. The following table describes the fluid held by some of the gasket separators 202, 204, 206, 208 and conveyed by the module inlet and outlet manifolds 140, 141 when the stack assembly 101 is operated in forward polarity and in reverse polarity:

TABLE 1

Role of Gasket Separators and Module Inlet and Outlet Manifolds when Stack is Operating in Forward and Reverse Polarities

| Fluid held by compartment in forward polarity | Fluid held by compartment in reverse polarity | Gasket Separator | Module Inlet Manifold | Module Outlet Manifold |
| --- | --- | --- | --- | --- |
| product feed | diluent_p | 208 | 140a | 141a |
| diluent_p | product feed | 206 | 140c | 141d |
| diluent_c | concentrate | 204 | 140d | 141c |
| concentrate | diluent_c | 202 | 140b | 141b |

Figure 3:
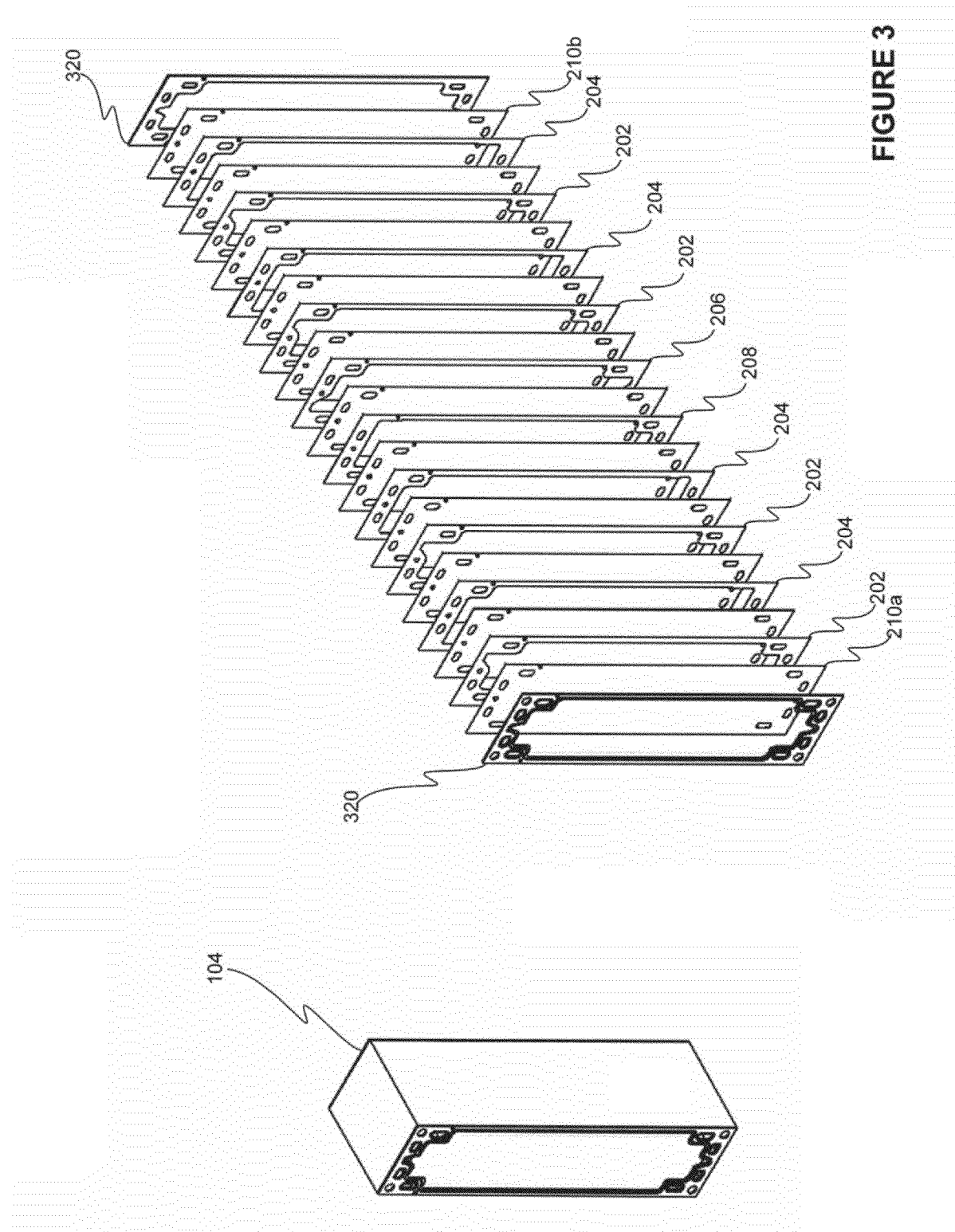
FIG. 3 shows perspective and exploded views of one of the internal modules of the stack of FIG. 1.

FIG. 3 depicts perspective and exploded views of one of the internal modules 104 that includes the gasket separators 202, 204, 206, and 208 that respectively circumscribe the concentrate, diluent_c, diluent_p, and product feed compartments when the stack assembly 101 in which the internal module 104 is integrated is operating in forward polarity. These gasket separators 202, 204, 206, 208 are separated from each other by one of the ion exchange membranes 210. Typically, the internal modules 104 include one or more drive cells, which each include adjacent diluent_c and concentrate compartments that are separated by one of the ion exchange membranes 210. Ionically communicatively coupled to the drive cells are one or more product cells, each of which includes adjacent product feed and diluent_p compartments that are also separated by one of the ion exchange membranes 210. Two elements that are "ionically communicatively coupled" together would be fluidly coupled together but for the presence of one or more of the ion exchange membranes 210. Additionally, references to elements that form part of an "ionic circuit" are to those elements that contact cations and anions as the cations migrate within the stack assembly 101 towards one end of the stack and as the anions within the stack assembly 101 migrate towards the opposite end of the stack while desalination is occurring.

Although the depicted embodiment is directed at a CDE desalination system in which ion exchange membranes are used, in an alternative embodiment, such as one directed at an MD desalination system, the membranes may instead be water vapour, instead of ion, permeable. In such an alternative embodiment, the fluids passing through the compartments of the stack assembly 101 may be, on one side of the water vapour permeable membrane, a relatively warm saline solution, and on the other side of the water vapour permeable membrane, a cooler and lower saline solution.

The ratio of drive cells to product cells varies based on the concentration difference between the saltwater solutions and on the desired ionic flux through the membranes 210. In general, higher ratios of drive cells to product cells are used when there is a relatively low difference between the concentrations of the concentrate and diluent_c and when there is a relatively high difference between the concentrations of diluent_p and product feed in order to maintain a reasonable ionic flux through the membranes 210. As the saltwater solutions pass through their respective compartments, the product feed is desalinated as ions migrate from the product feed to the diluent_p, which increases in concentration, under the ionic current established as salt ions transfer from the concentrate to the diluent_c due to the salinity gradient. Thus, the concentrate decreases in concentration as it passes through the compartment and the diluent_c increases in concentration.

The internal module 104 is bounded on either side by internal module end plates 320 which provide a rigid surface that aids in compressing the gasket separators and ion exchange membranes 210 while also maintaining ionic communication between adjacent internal modules 104 via the module ion transfer fluid flowing through an end plate compartment 402 formed by fixedly coupled together two of the end plates 320, as described below. The modules 104 are assembled such that one of the cation exchange membranes 210a is between one of the module end plates 320 and the concentrate gasket separator 202 on one end of the internal module 106, and one of the anion exchange membranes 210b is between the module end plate 320 and the diluent_c gasket separator 204 on the other end of the internal module 106. Two adjacent internal modules 106 are mated by connecting the module end plate 320 of one internal module 104 with the module end plate 320 of an adjacent internal module 104 such that an end plate compartment is formed with the cation exchange membrane 210a on one side and the anion exchange membrane 210b on the other side. When two of the internal modules 104 are fluidly coupled together, an o-ring or one or more of the completion compartment gasket separators 209 is inserted between the two end plates 320 to provide fluidic sealing. If o-rings are used, they are inserted in the o-ring grooves 412 shown in FIG. 4.

Figure 4:
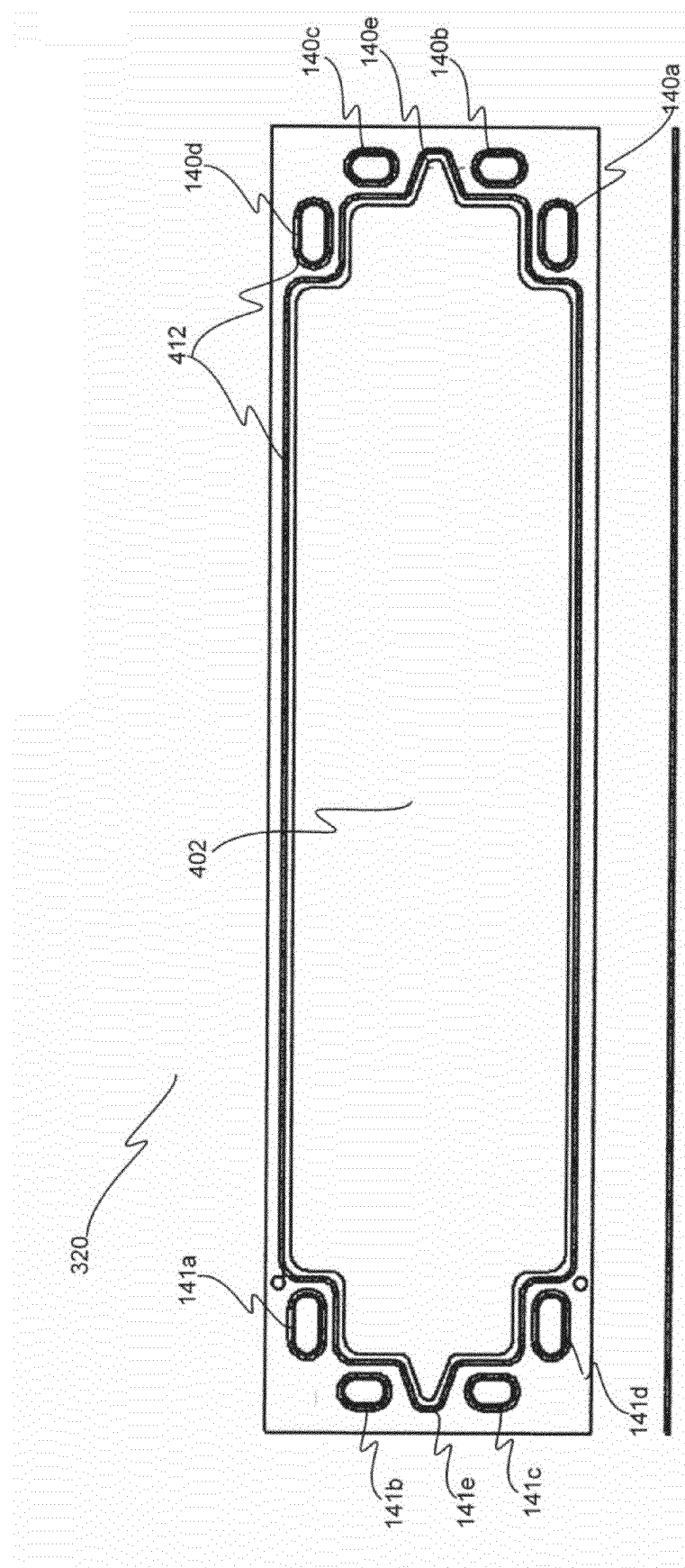
FIG. 4 shows a front elevation view of an interior end plate that is at the ends of the internal modules of the stack of FIG. 1.

Referring now to FIG. 4, there is shown one embodiment of the internal module end plates 320. In the embodiment depicted in FIG. 4, the internal module end plate 320 is made from a thin, rigid, electrically insulating material such as high density polyethylene or polyvinyl chloride. The internal module end plate 320 includes the end plate compartment 402 and module inlet and outlet manifolds 140, 141. To prevent mixing of various saltwater solutions o-rings may be installed in o-ring groves 412 that circumscribe the manifolds 140, 141 and end plate compartment 402. During operation the module ion transfer fluid is pumped through the end plate compartment 402 to enable ionic communication between adjacent modules 104. The module ion transfer fluid enters the end plate compartment 402 via the module inlet manifold 140e and exits through the module outlet manifold 141e. Optionally, the diluent_c may be pumped into the end plate compartment 402 instead of the module ion transfer fluid if the stack assembly 101 is being operated in reverse polarity to effect de-scaling. Alternative embodiments of the internal module end plates 320, such as those depicted in and discussed in respect of FIGS. 15 to 19, are also possible.

Figure 5:
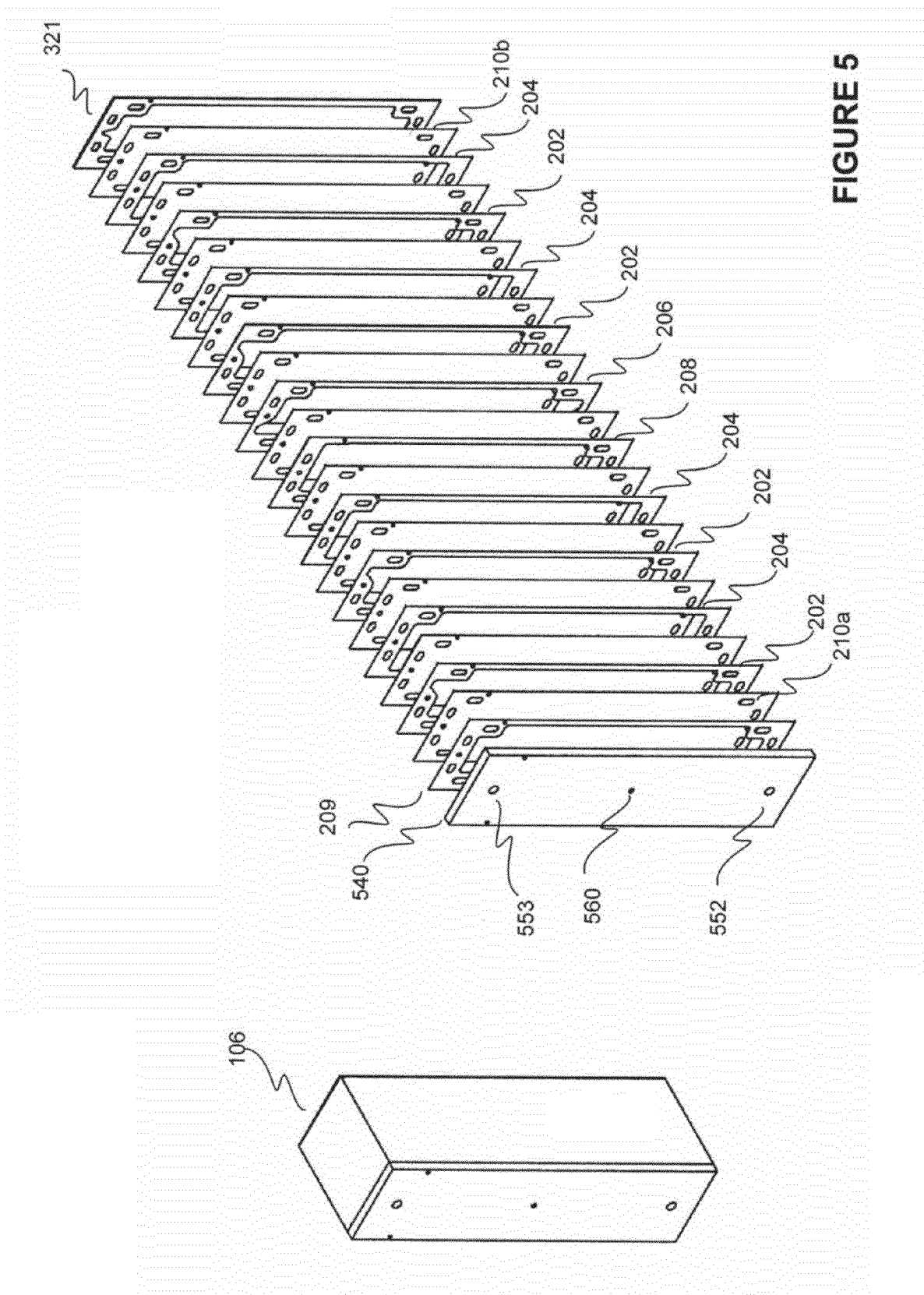
FIG. 5 shows perspective and exploded views of one of the end modules of the stack of FIG. 1.

Referring now to FIG. 5, there is shown perspective and exploded views of one of the end modules 106, which is similar in construction to the internal modules 104 with one difference being it is bounded by one of the internal module end plates 320 on the side that interfaces with a neighbouring one of the internal modules 104 and a rigid and electrically insulative exterior end plate 540 on the opposite side. The exterior end plate 540 serves three functions:
1. It provides rigid and electrically insulative end support for the stack assembly 101 upon which a compressive force can be placed by the tensioning frame 1606.
2. It distributes saltwater solutions from the stack manifolds 120 to the module inlet and outlet manifolds 140, 141.
3. It completes the ionic circuit, for example in one of the following manners:
   a. electrochemically, via oxidation and reduction reactions of an electrolyte at electrodes; or
   b. using ionic fluid communication from one of the exterior end plates 540 to the other by either circulation of or submersion in a conductive electrolyte fluid. The conductive electrolyte fluid may be, for example, the diluent_p, diluent_c, or concentrate.

The exterior end plate 540 can be outfitted with an electrolyte inlet port 552 and outlet port 553 as well as a sealed electrode connection hole 560 through which an electrode (not shown) is inserted. Connection of the electrode on one end of the stack assembly 101 to the electrode on the other end of the stack assembly 101 completes the ionic circuit. Measurement of the current in the wire via an ammeter enables performance measurement of the stack assembly 101 as a direct correlation exists between measured current and desalination rate. Decreased current can indicate one or more of leakage, saltwater solution concentration issues, and ion exchange membrane fouling. Ion exchange membrane fouling may indicate that the polarity of the stack assembly 101 should be reversed to effect membrane de-scaling.

Optionally, sample ports (not shown) may be present in one or more of the module outlet manifolds 141 to allow for air relief and sampling; sampling can be useful for testing for the presence of leaks. Leaks may be detected by injecting a trace compound such as a die; by sampling the concentrations of the solutions exiting via the outlet manifolds 141 to see if they fall outside of a specified, acceptable range; or by closing the saltwater inlet and outlet valves on all fluid streams except one, opening all sample valves on the streams whose inlet and outlet valves have been closed, and checking to see if saltwater exits through any of the opened sample valves, which would indicate a leak.

In an alternative embodiment (not shown), the end module 106 may not include any drive or product cells, and may instead include only a single one of the completion compartment gasket separators 209 and one of the ion exchange membranes such that the end module 106 is smaller than that depicted in FIG. 5 and contains only one membrane. This simplifies performing stack related repairs and troubleshooting since the vast majority of membranes are contained in internal modules 104, which can be more readily removed than the end modules 106 since the end modules 106 are directly coupled to various valves and piping (not shown) that fluidly couples the stack assembly 101 to the stack manifolds 120.

Although FIG. 1 shows the container 102 with a certain number of the modules 104, 106, in alternative embodiments (not shown) the container 102 may have a different number of the modules 104, 106. Additional modules may be installed to increase desalination capacity. The embodiment depicted includes space on the sides of the modules to enable inspection as well as removal of any one module without removing all modules. In another embodiment (not shown), the two rows of stacks shown in FIG. 1 may be spaced apart to facilitate physical inspection from multiple sides. Operation of the stack assembly 101 can be maintained with one of the internal modules 104 removed by installing a "blank module" (not shown) that is constructed from one or more of the interior end plates 320 fastened together to form one large end plate compartment. One or more of the completion compartment gasket separators 209 is placed between the interior end plates 320 to create a fluid tight seal. During operation, the blank module is filled with the module ion transfer fluid, which enables the ionic circuit to continue conducting. Although the blank module would not generate a drive voltage or directly desalinate any of the product feed, it would enable continued operation of and desalination by the other modules 104, 106.

Figure 6:
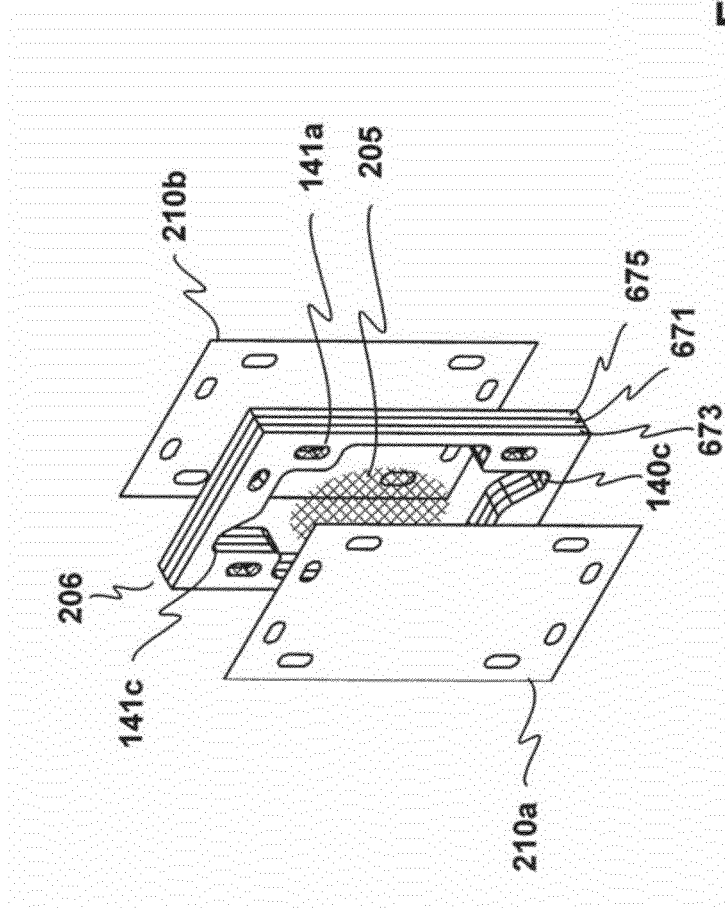
FIG. 6 shows an exploded view of one embodiment of a gasket separator positioned between two ion exchange membranes, which can be used in the stack of FIG. 1.

FIG. 6 shows a perspective view of the diluent_p gasket separator 206 sandwiched between the cation and anion exchange membranes 210a, 210b. The diluent_p gasket separator 206 is used for illustrative purposes only; the following description applies equally to other types of the gasket separators. The gasket separator 206 is constructed using three layers: a non-porous, rigid or semi-rigid, core layer 671, which is bonded between non-porous, flexible sealing layers 673, 675 using any one or more of heat, adhesive, a chemical reaction, ultrasound, ultraviolet light or radio frequency waves or other radiation, or other bonding means, and with or without mechanical compression, as is suitable. Exemplary materials for the rigid core layer 671 can include high density polyethylene, or the like, with the material having a high modulus of elasticity relative to the sealing layers 673, 675 and matched to the mechanical requirements of the encompassing stack assembly 101 and chemical compatibility requirements of the fluid streams passing through the manifolds 140, 141. Exemplary materials for the sealing layers 673, 675 can include ethylene vinyl acetate, silicone rubber, or another non-porous material with low durometer, preferentially ranging from Shore 40 A to Shore 80 A, or matched to the mechanical sealing requirements of the adjacent membranes 210a, 210b, having chemical compatibility with the material used in the core layer 671 and the fluid streams passing through the manifolds 140, 141. The exemplary embodiment of FIG. 6 shows a single core layer with one sealing layer attached or bonded to each face of the core layer; however, multiple core layers 671, sealing layers 673, 675 or both can be used in alternative embodiments (not depicted).

The manifolds 140, 141 transport fluid streams from one end of the stack assembly 101 to the other, while the diluent_p compartment allows fluid to travel transverse to the direction in which the manifolds 140, 141 extend. The separator mesh 205 helps to prevent the cation and anion exchange membranes 210a, 210b from directly touching each other, while introducing turbulent flow and mixing to the fluids within the compartment to facilitate contact with a relatively large area of the membranes 210a, 210b. The mesh 205 may be, for example, a woven or non-woven mesh of polypropylene, polyethylene, nylon or another suitable porous material. In one embodiment, the polypropylene mesh 205 serves to keep the membranes 210 separate and also serves to mechanically reinforce the sealing layers 673, 675. Also according to this embodiment, the single sealing layer 673 consisting of ethylene vinyl acetate heat is pressed into mesh 205 at a temperature greater than the melting point of ethylene vinyl acetate but less than the melting point of the polypropylene mesh 205 such that the final heat pressed thickness of the ethylene vinyl acetate sealing layer 673 is 5 to 10% thicker than the mesh 205, thereby providing space for compression to occur.

Figure 7:
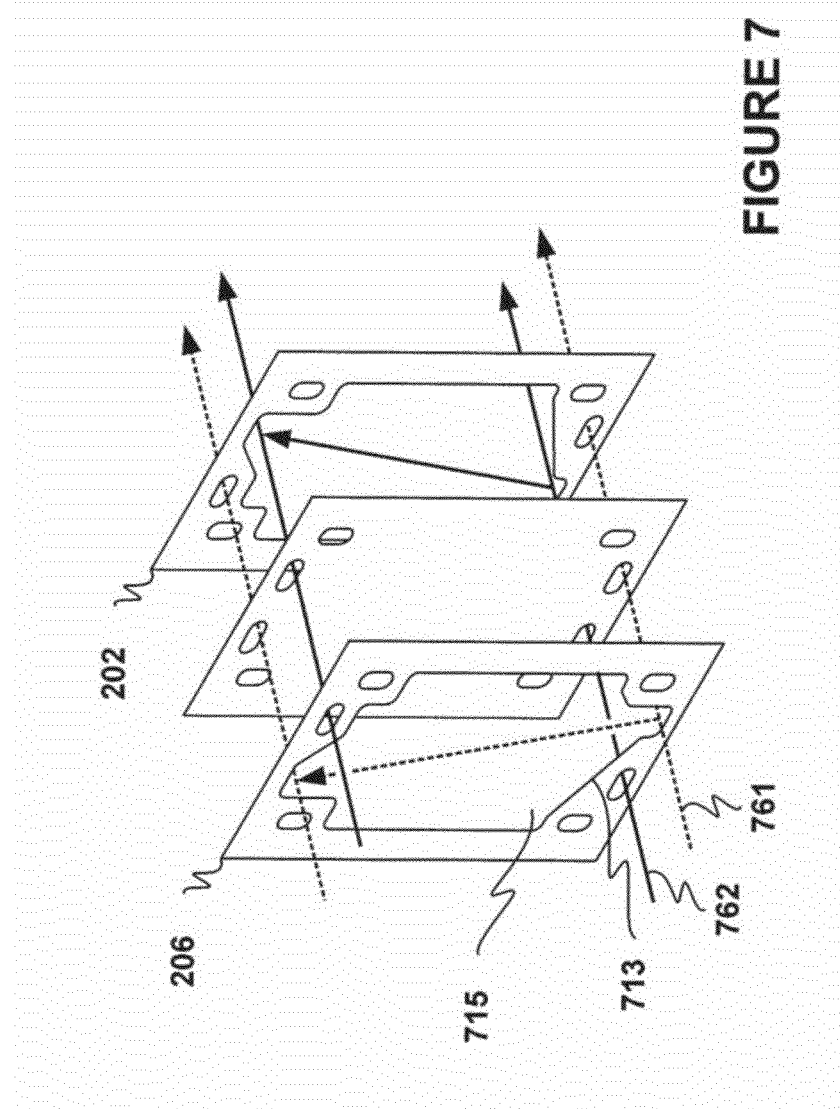
FIG. 7 shows an exploded view of a pair of the gasket separators around one of the ion exchange membranes, and arrows indicating how fluid flows therethrough.

FIG. 7 is a perspective view showing the concentrate and diluent_p gasket separators 202, 204 separated by one of the ion exchange membranes 210. As mentioned above, the gasket separators 202, 206 include notches that fluidly coupled the compartments that are circumscribed by the gasket separators 202, 206 to the inlet and outlet manifolds 140, 141. The notch that fluidly couples the inlet manifolds 140 to the compartment is hereinafter referred to as the "inlet notch", while the notch that fluidly couples the outlet manifolds 141 to the compartment is hereinafter referred to as the "outlet notch". The notches have different geometries such that fluid distribution effectiveness within the compartments is improved by optimizing any one or more of: the velocity and direction of fluid entering the compartment through the inlet notch; the channeling of fluid to fill the entirety of the compartments and to prevent formation of the dead spots 715, and to exit through the outlet notch to the outlet manifolds 141; and the relief of trapped air or other gases from within the compartment through the outlet manifolds 141. The inlet notch includes a sloped surface 713 that directs fluid towards a dead spot 715 on the long side of the compartment to increase the effectiveness of fluid distribution within the compartment.

FIG. 7 also illustrates how different fluid streams travel axially between the opposing ends of the stack assembly 101, and how the fluid streams enter the compartments. In FIG. 7, when the stack assembly 101 is operating in forward polarity, a diluent_p stream 761 is shown in stippled lines being transported along the diluent_p manifolds, entering the diluent_p compartment through the inlet notch of the diluent_p compartment, and exiting the diluent_p compartment through the diluent_p compartment's outlet notch. Similarly, a concentrate stream 762 is shown in solid lines being transported along the concentrate manifolds, entering the concentrate compartment through the inlet notch of the concentrate compartment, and exiting the concentrate compartment through the concentrate compartment's outlet notch. The exemplary embodiment shows the gasket separators 202, 206 having reflection symmetry; however, in alternative embodiments (not shown) other forms of symmetry can be used for any of the gasket separators, such as rotational symmetry, translational symmetry, or other patterns of repetition that result in reduced costs for design and manufacturing.

Figure 8:
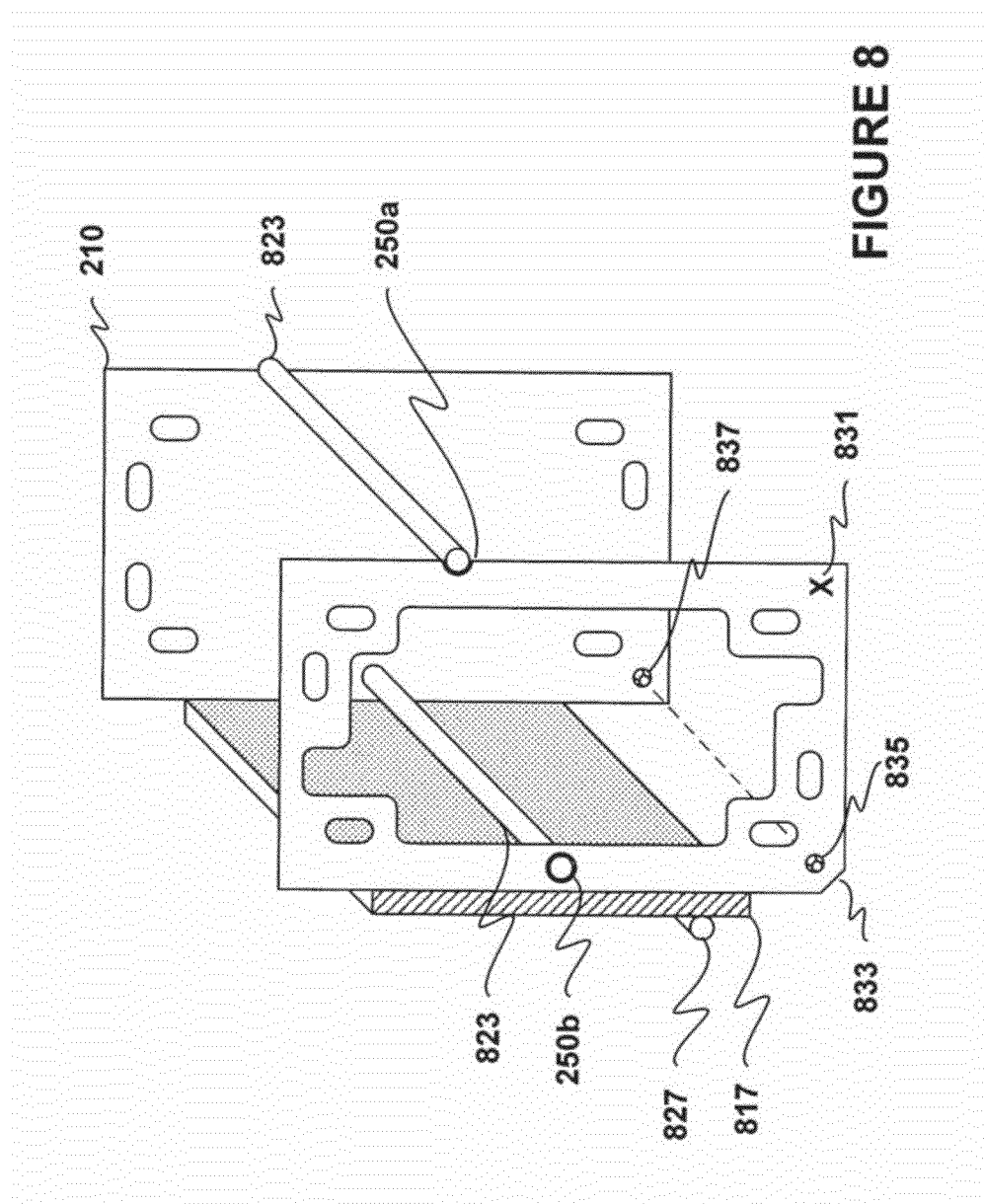
FIG. 8 shows a perspective view of two of the gasket separators that are being aligned and stabilized using a combination of dowels and a lateral restraining member, according to one embodiment.

Referring now to FIG. 8, there is shown one embodiment of the diluent_p gasket separator 204 placed adjacent to one of the ion exchange membranes, which may be used to construct one embodiment of the stack assembly 101. The gasket separator 206 includes a semicircular dowel hole 250a with a dowel 823 passing through it to align the gasket separator 206 with the membrane 210 and to stabilize the gasket separator 206 and membrane 210 during stack operation. The semicircular dowel hole 250a is beneficial in that compared to the dowel hole 250b described below, its end faces occupy less area and therefore less area of the membrane 210 is lost when the dowel 823 is inserted through it. The gasket separator 206 also includes the circular dowel hole 250b (collectively, the dowel holes 250a,b are referred to as "dowel holes 250") and another of the dowels 823 in an opposing edge of the gasket separator 206. In this embodiment the gasket sealing surface width increases and membrane active area decreases slightly, but mechanical integrity and sealing reliability are improved relative to the semicircular dowel hole 250a. This is beneficial when, for example, tensioning rods are inserted through the dowels 823, described in reference to FIG. 16 below. A lateral restraining plate 817 contacts the long edge of the gasket separator 206 and is held in place by an outer support member 827. The dowels 823 positioned on the opposing edges of the gasket separator 206, and the outer support member 827 in conjunction with the restraining plate 817, together or separately constrain the movement of gasket separator 206, thereby improving the alignment of the gasket separator 206 relative to other layers within the stack assembly 101 while helping to prevent relative movement between different layers in the stack assembly 101, which could result in leakage. The exemplary embodiment shows the dowels 823 being smooth, solid, and circular; however, as discussed in further detail below, the dowels 823 in an alternative embodiment may be hollow for use in combination with tensioning cables or rods that run within through them. Additionally, the dowels 823 may be placed in other locations, such as within the perimeter of the gasket separator 206 and not connected to other cut-outs, or outside the periphery of the gasket separator 206 and in contact with the restraining plate 817 that is in contact with the edge of said gasket. Exemplary dowel materials may include stainless steel, titanium, plastic, or another material produced from, or coated with, an electrically insulating material such as high density polyethelyne or polyvinyl chloride that is matched to the mechanical forces present in the stack assembly 101 and that is chemically compatible with the fluids and materials flowing through and used to construct the stack assembly 101. The exemplary embodiment shows one of each dowel configuration; however, a plurality of dowel holes, dowels and restraining plates can instead be used around the perimeter of the gasket separator 206, as discussed in more detail in respect of FIGS. 15 to 19, below.

Also shown in FIG. 8 are a marking 831, a shaved edge 833 and a raised profile 835 on the gasket separator 206, which, independently or in combination, provide a visual indicator that can be used to improve stack assembly efficiency, thereby reducing manufacturing costs. The raised profile 835 constrains the movement of the gasket separator 206 when the gasket separator 206 is compressed against the ion exchange membrane 210, which has a similarly raised profile 837 into which the raised profile 835 on the gasket separator 206 fits. The complementary raised profiles 835, 837 help to align and stably maintain together the gasket separator 206 and the membrane 210 during stack assembly and operation, thereby helping to prevent relative movement of stack components that could result in leakage Although FIG. 8 shows one each of the marking 831, shaved edge 833, and raised profile 835 on the gasket separator 206, in an alternative embodiment (not shown) any suitable number of these may be used.

Figure 9:
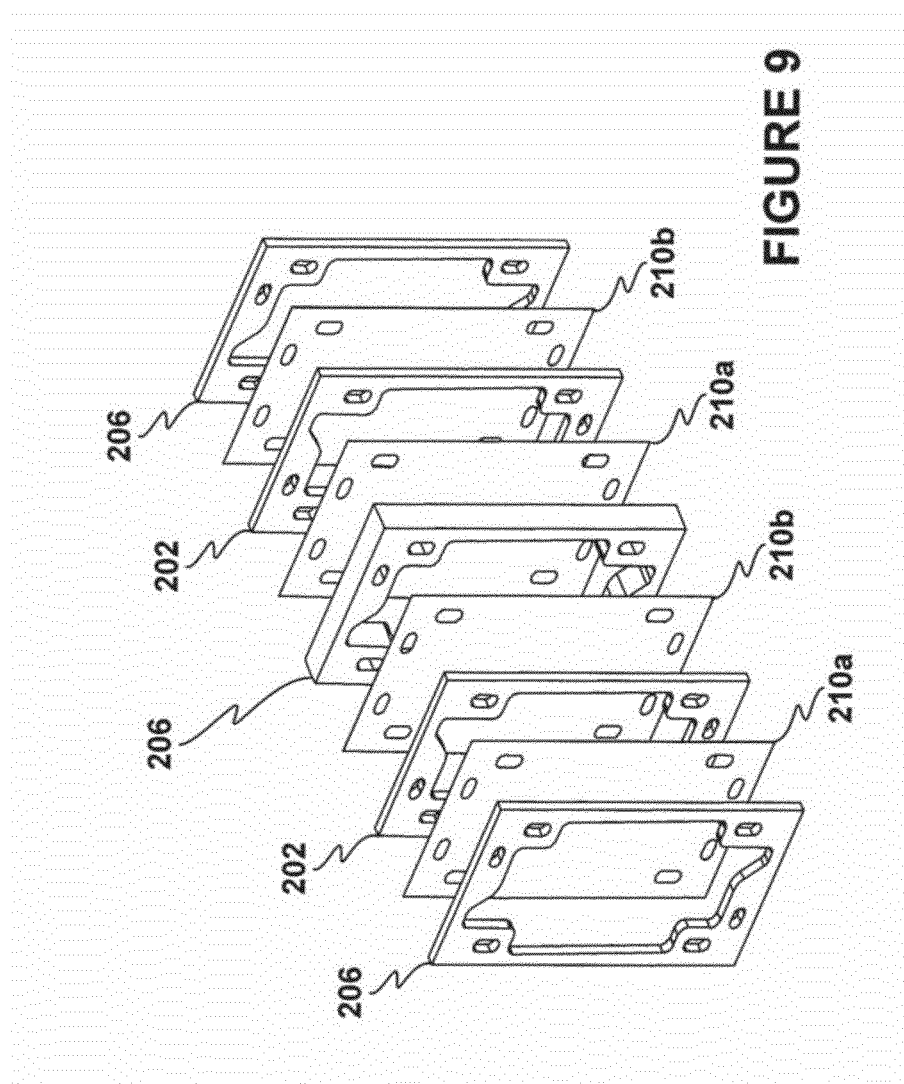
FIG. 9 shows an exploded view of a series of the gasket separators and ion exchange membranes, with one of the gasket separators being made from a relatively rigid material to facilitate structural stability, according to one embodiment.

Referring now to FIG. 9, there is shown a portion of the stack assembly 101 that includes an alternating series of the gasket separators 206, 202 and membranes 210a, 210b. The centrally positioned gasket separator 206 is thicker than the other separators of FIG. 9, and is made of a more rigid material. This thicker separator 206 accordingly provides structural support to the stack assembly 101, thereby helping to prevent the stack assembly 101 from buckling. Exemplary materials for the relatively thick gasket separator 206 include high density polyethylene, low density polyethylene, silicone rubber, or any suitable non-porous elastomer.

Figure 10:
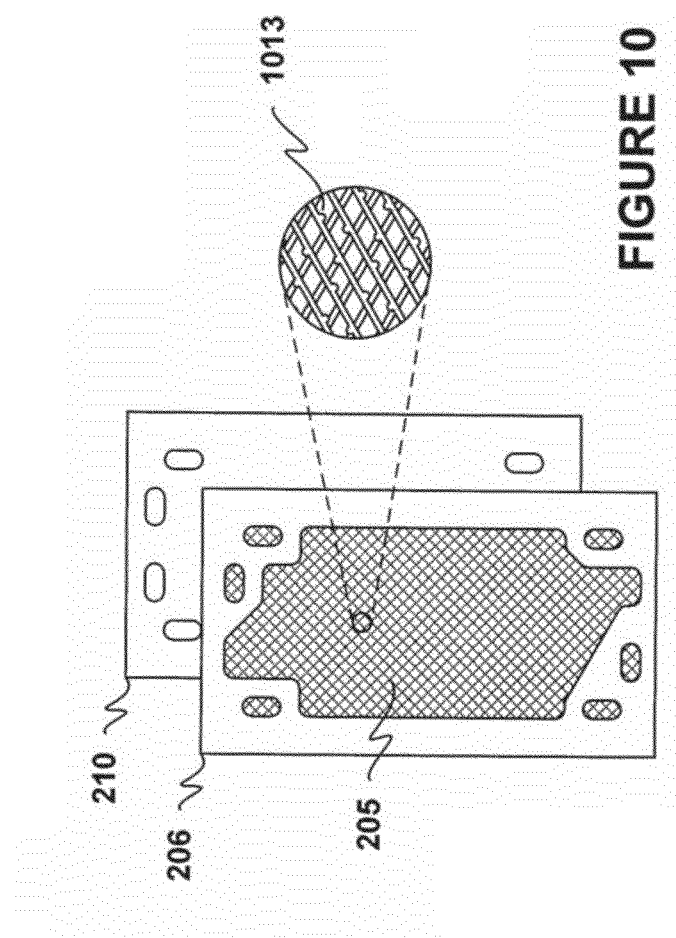
FIG. 10 shows a detailed view of a mesh that can be placed within the gasket separators, according to one embodiment.

Referring now to FIG. 10, there is shown an exemplary one of the gasket separators 206 adjacent to one of the ion exchange membranes 210. The diluent_p gasket separator 206 is shown for illustrative purposes, the gasket separator 206 accordingly circumscribes diluent_p compartment. The mesh 205 is present within the compartment, and is composed from a woven structure 1013 that introduces fluid turbulence such that the boundary layer thickness at the interface between the gasket separator 206 and the adjacent membrane 210 is reduced, resulting in improved dialytic performance across the membrane 210.

Figure 11:
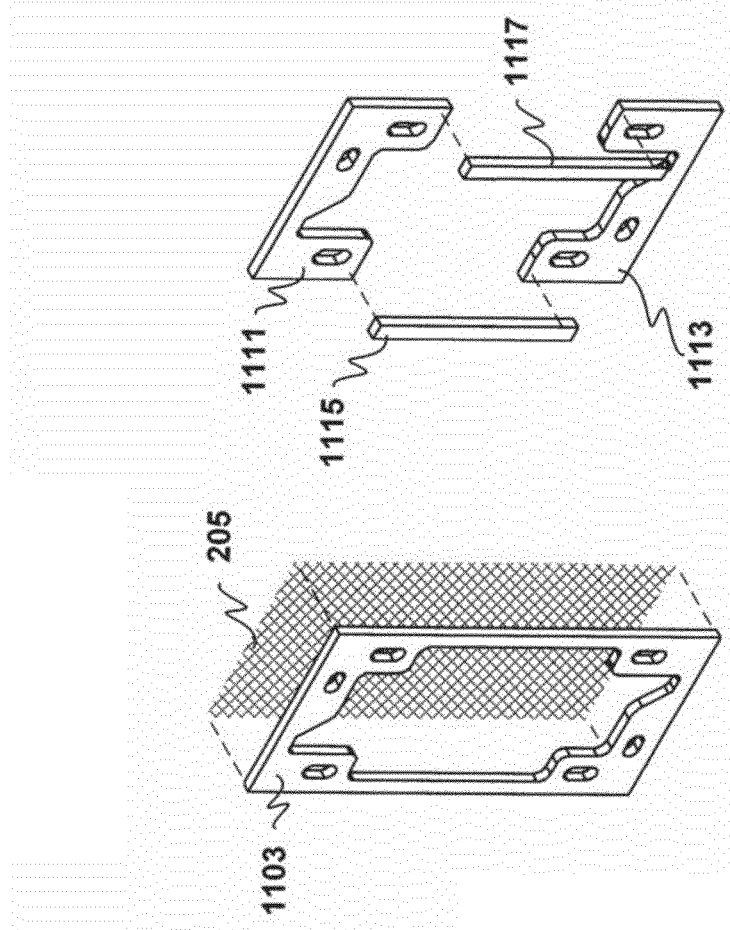
FIGS. 11 and 12 show how the mesh and the gasket separator of FIG. 10 can be bonded together, and shows how the gasket separator itself can be manufactured, according to one embodiment.

FIG. 11 depicts how one of the gasket separators can be made, according to one embodiment of a method for making the gasket separator from a non-porous border material 1103 and the mesh 205. The border material 1103 is attached or otherwise bonded to the porous mesh 205 using any combination of heat, adhesive, chemical reaction, ultrasound, ultraviolet light or radio frequency waves or other radiation, compression, hook and loop fastening or other attachment or bonding means, such that the mesh 205 fills the compartment circumscribed by the interior of the gasket separator and all the manifolds 140, 141 extending through the gasket separator. The mesh 205 prevents adjacent membranes from touching, introduces turbulent flow to the compartment, and when bonded into the border material 1103 through, for example, heat pressing techniques, will stiffen the border and manifolds 140, 141 area, thereby preventing stretching of the gasket separator. The manifolds 140, 141 may be introduced into the border material 1103 prior to bonding with the mesh 205 via die punching in a press, using a patterned roll in a roll-to-roll manufacturing process, water jet cutting, or by other suitable means. After bonding such that the mesh 205 is fully integrated into the border material 1103, the gasket separator may be trimmed or otherwise cut to a specific shape or pattern by the aforementioned manufacturing process.

For example, in FIG. 11 the border material 1103 may be made from ethylene-vinyl acetate having a durometer reading from about Shore A20 to Shore A60 and a melting point of around 130° C. The mesh 250 may be made from polypropylene and have a melting point of around 170° C. Because the mesh 250 is to fit within the compartment circumscribed by the gasket separator, the mesh 250 is also thinner than the border material 1103; typically, the mesh 250 is about 2% to 5% thinner than the border material 1103. The mesh 250 is overlaid on the border material 1103, and the temperature of the mesh 250 and the border material 1103 is then increased to between 130° C. and 170° C. This melts the border material 1103 sufficiently to allow the mesh 250 to be bonded to it, without melting the mesh 250 itself. In an alternative embodiment, the mesh 250 may have a lower melting temperature than the border material 1103, and the two may instead be bonded together by melting the mesh 250.

FIG. 11 also depicts the gasket separator being made according to one embodiment in which a border material 1103 having short sides 1111, 1113 and long sides 1115, 1117 are attached or bonded with each other to result to form a rectangular separator. The mesh 205 and short and long sides 1111, 1113, 1115, 1117 are attached or bonded using any of the aforementioned means, beneficially resulting in less material wastage than if the border material 1103 were punched from a single piece of material. The exemplary embodiment shows four individual pieces in the form of short and long sides 1111, 1113, 1115, 1117; however, in an alternative embodiment any suitable number of pieces may be joined to form the border material 1103.

Figure 12:
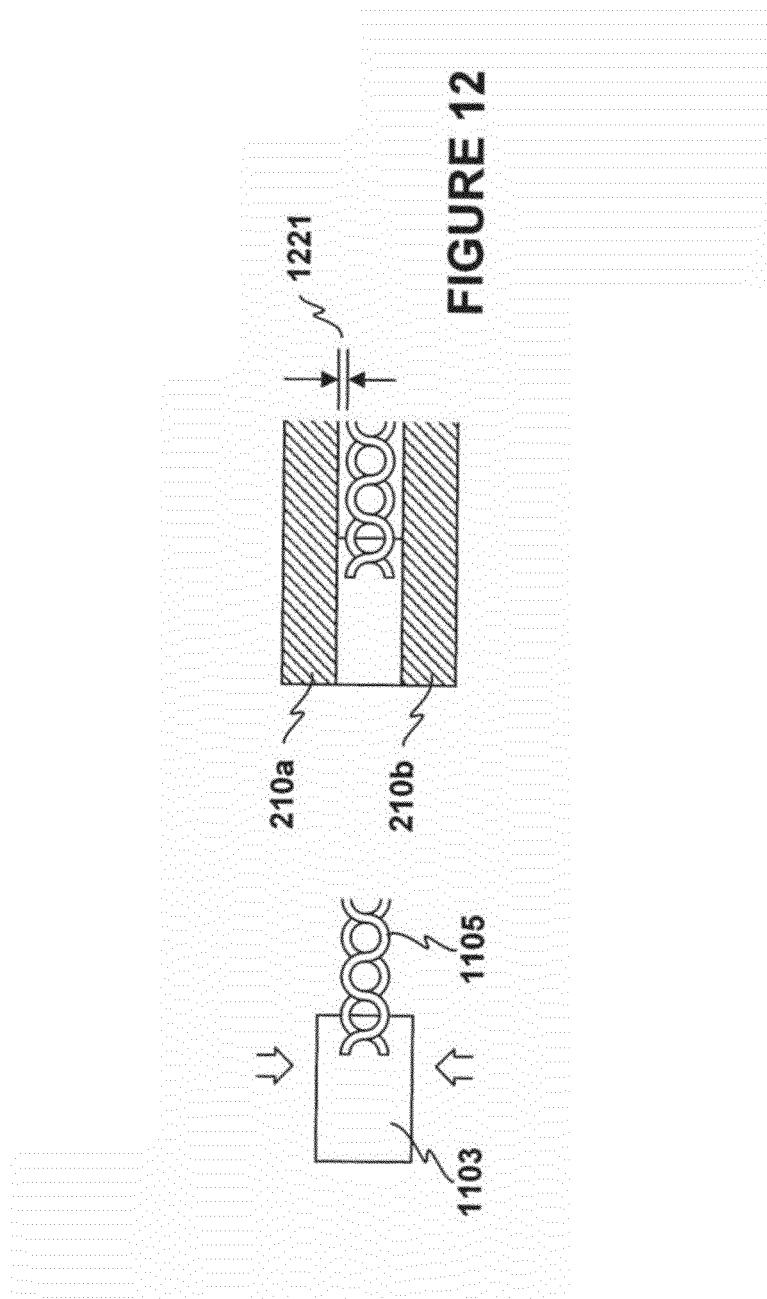

Referring now to FIG. 12, there is shown a cross-sectional view of one of the gasket separators comprising the nonporous border material 1103 and the porous mesh 205, with the border material 1103 having a first melting point and the mesh 205 having a second melting point higher than the first melting point to enable heat pressing of the border material 1103 into the mesh 205. The thickness of the border material 1103 is selected such that upon application of suitable heat and compression, the border material 1103 melts into the mesh 205 and, after cooling, the resulting thickness of the border material 1105 is greater than that of the mesh 205 by a calculated amount 1221, typically between 2 and 5% on each side of the mesh 205.

Figure 13:
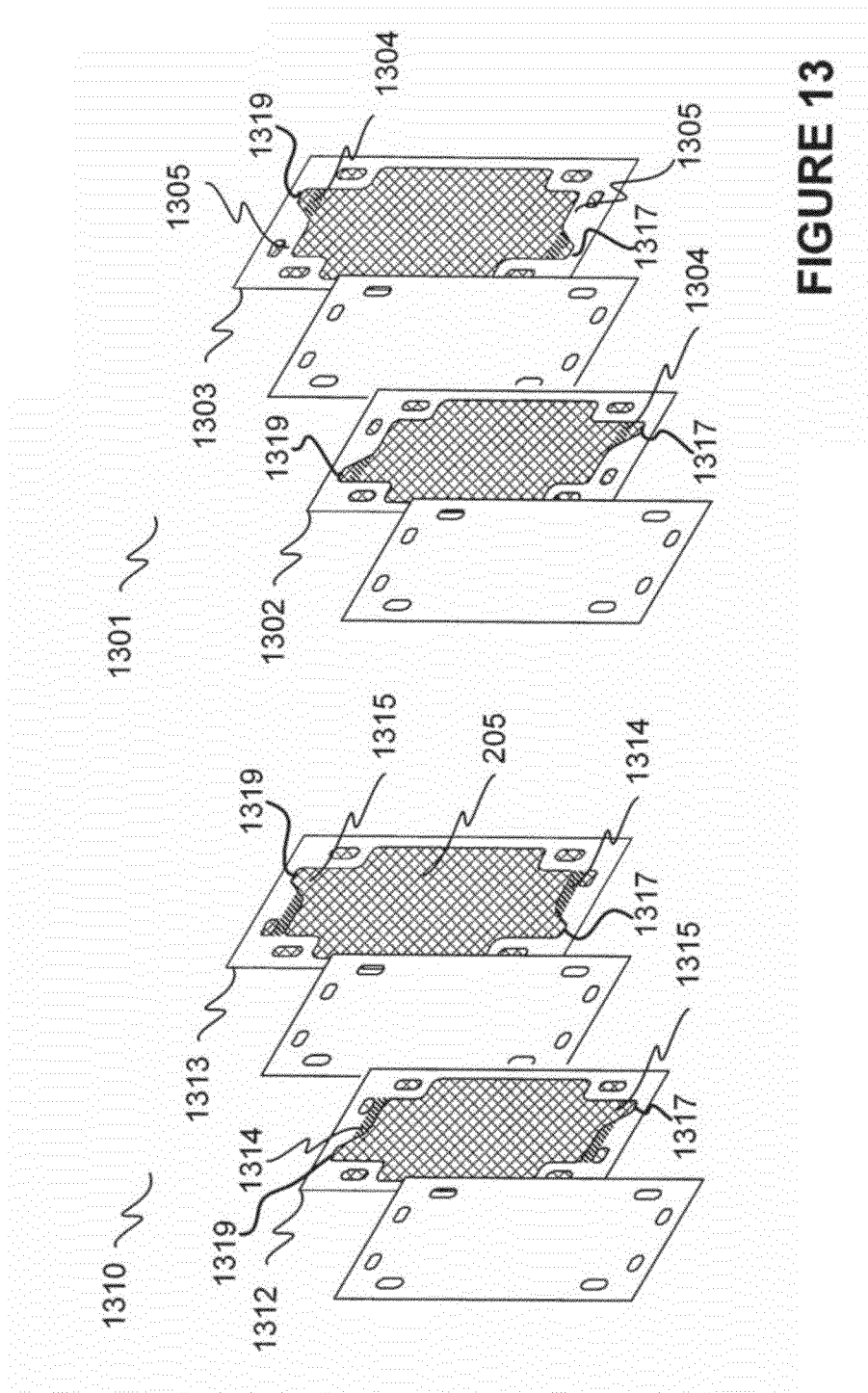
FIG. 13 shows how a portion of the mesh that has been bonded to one of the gasket separators can be made relatively thick in order to mitigate leakage, according to one embodiment.

Referring now to FIG. 13, there are shown two exemplary embodiments of the gasket separators and adjacent membranes configured to mitigate against the problem of leakage caused by gaps between the surfaces of the membranes and the gasket separators: a "thick notch mesh embodiment 1301" and a "thick notch border embodiment 1310". As described above in respect of FIG. 11, the mesh 205 is typically slightly thinner than the edge of the gasket separator. Leakage may accordingly occur in and around the inlet and outlet notches 1317, 1319 as neighbouring gasket separators and membranes deflect into the notches 1317, 1319, thereby creating a fluid path to or from the gasket separator of a neighbouring compartment. Deformation of neighbouring gasket separators into the notches 1317, 1319 increases as the number of gasket separators and membranes in any single one of the modules 104, 106 increases. For example, when the gap between the gasket edge 203 and mesh 205 thicknesses is 0.03 mm and there are a hundred layers in the stack assembly 101, total deflection at the hundredth layer is 100*0.03 mm=3 mm, which can result in significant leakage. Adding one or both of a thick mesh supporting region 1304 (in the thick notch mesh embodiment 1301) and a thick gasket supporting region 1314 (in the thick notch border embodiment 1310) increases the thickness of the notches 1317, 1319 or their neighbouring areas, and accordingly decreases gap size in neighbouring compartments as the increased thickness pushes against neighbouring gaps, helping to close them. This can help to prevent membrane and gasket separator deflection and stop leakage.

In the thick notch mesh embodiment 1301, the thick mesh supporting region 1304 of each of the gasket separators 1302, 1303 is a relatively thick portion of the mesh 250 in the vicinity neighbouring the notches 1317, 1319; in the depicted embodiment, the thick mesh supporting region 1304 delineates the portion of the gasket separators 1302, 1303 that is punched out to form the inlet and outlet notches 1317, 1319. The thick mesh supporting region 1304 in one of the gasket separators 1302 helps compress the inlet notch 1317 of an adjacent gasket separator 1303. The thick mesh supporting region 1304 pushes and seals the membrane that is between the two gasket separators 1302, 1303 against a portion 1305 of the inlet notch 1317 in the adjacent gasket separator 1303. The thick mesh supporting region 1304 is typically approximately 5% thicker than the rest of the mesh 205; it can be produced by adhering another layer of the mesh 205 on top of the portion of the mesh 205 where the thick mesh supporting region 1304 is to be formed. The portion 1305 of the inlet notch 1317 of the adjacent gasket separator 1303 is the same material and thickness as the gasket edge 203. In alternative embodiments (not depicted), the thick mesh supporting region 1304 may be more or less than 5% thicker than the remainder of the mesh 205, as is suitable.

In the thick notch border embodiment 1310, the mesh 205 is of uniform thickness throughout. However, each of the gasket separators includes a thick gasket notch zone 1314 that is typically approximately 5% thicker than the remainder of the gasket edge 203. In the depicted embodiment, one of the thick gasket notch zones 1314 is formed on each of the short sides of the gasket separators 1312, 1313 that are not punched out when the inlet and outlet notches 1317, 1319 are formed. The thick gasket notch zone 1314 can be produced by layering a portion of gasket material, with the same geometry as the notches 1317, 1319, over the gasket edge 203 where the thick gasket notch zone 1314 is to be formed. This is typically done during manufacturing so that the thick gasket notch zone 1314 is fully integrated into the gasket separator through heat pressing or other means. The effect is that the adjacent thick gasket notch zone 1314 pushes and seals the membrane against the gasket notch zone 1315 of an adjacent gasket separator, thereby preventing inter-compartment leaks.

Also as shown in FIG. 13, pairs of adjacent inlet notches 1317 or outlet notches 1319 also do not overlap with each other so as to help prevent leakage. If adjacent notches 1317, 1319 were to be aligned, the likelihood of significant gaps forming in any one or more of a series of the aligned notches 1317, 1319 would increase. By alternating notch location through the stack assembly 101, leakage is accordingly mitigated.

Figure 14:
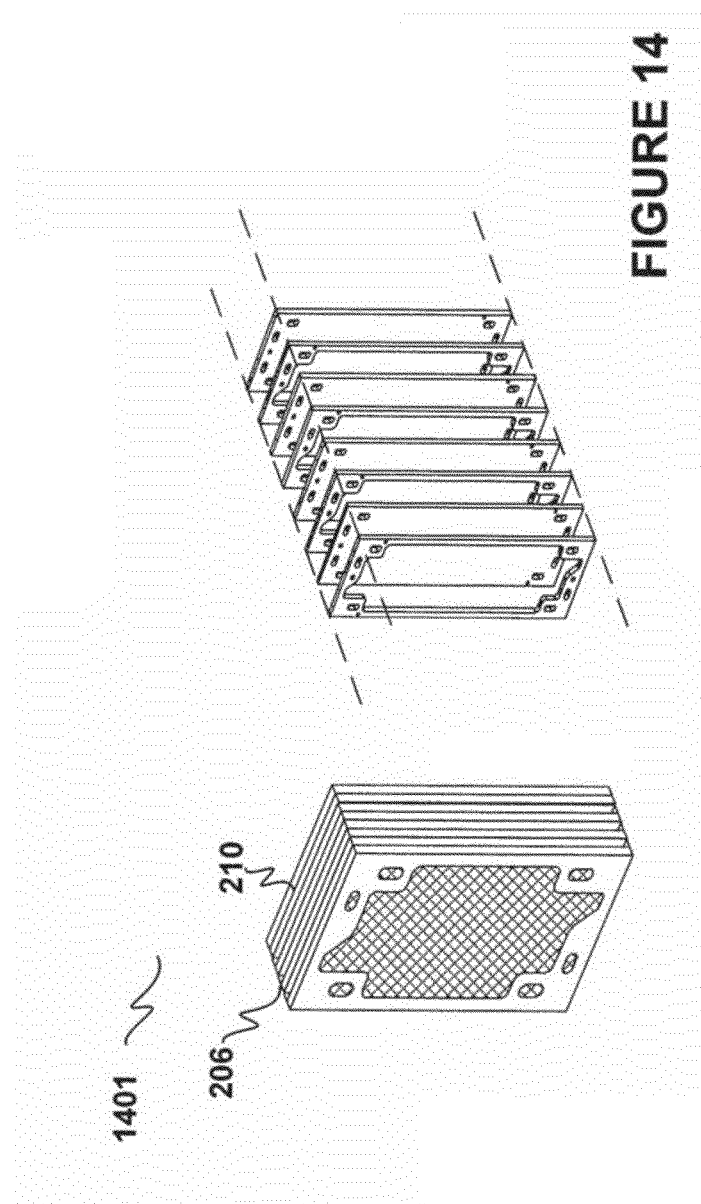
FIGS. 14 and 15 show perspective and exploded views of one of the internal modules that can be used in the stack of FIG. 1, according to additional embodiments.

Referring now to FIG. 14, there is shown perspective and exploded views of one embodiment of a gasket membrane cartridge 1401 manufactured from a series of the gasket separators 206 attached or bonded to adjacent ion exchange membranes 210, resulting in an improved seal between the gasket separator and membrane, and such that the gasket-membrane cartridge 1401 is a discrete unit for the purposes of more efficient assembly of the encompassing modules 104, 106 and stack assembly 101. A single one of the modules 104, 106 may be constructed using, in part, several of the gasket-membrane cartridges 1401. Means of attaching the gasket separator 206 to the membrane 210 can include any combination of heat, adhesive, chemical reaction, ultrasound, ultraviolet light or radio frequency waves or other radiation, compression. For example, a moisture cure adhesive, such as polyurethane adhesive, could be used to keep the membrane 210 wet during assembly. Any of the foregoing embodiments of the gasket separators may be incorporated into the gasket membrane cartridge 1401.

The membranes 210 may be shaped such that its surface takes on a variety of two or three dimensional features or patterns. For example, the membranes 210 may be formed to include any one or more of channels that act as a fluid conduit between the inlet and outlet manifolds 140, 141; the manifolds 140, 141 themselves; and ripples to facilitate membrane flexing. Any suitable combination of chemical etching; radiation grafting; a die press; a patterned roll in a roll-to-roll manufacturing process; and casting using a mold, due, or similar means may be used to suitably shape the membranes 210.

Figure 15:
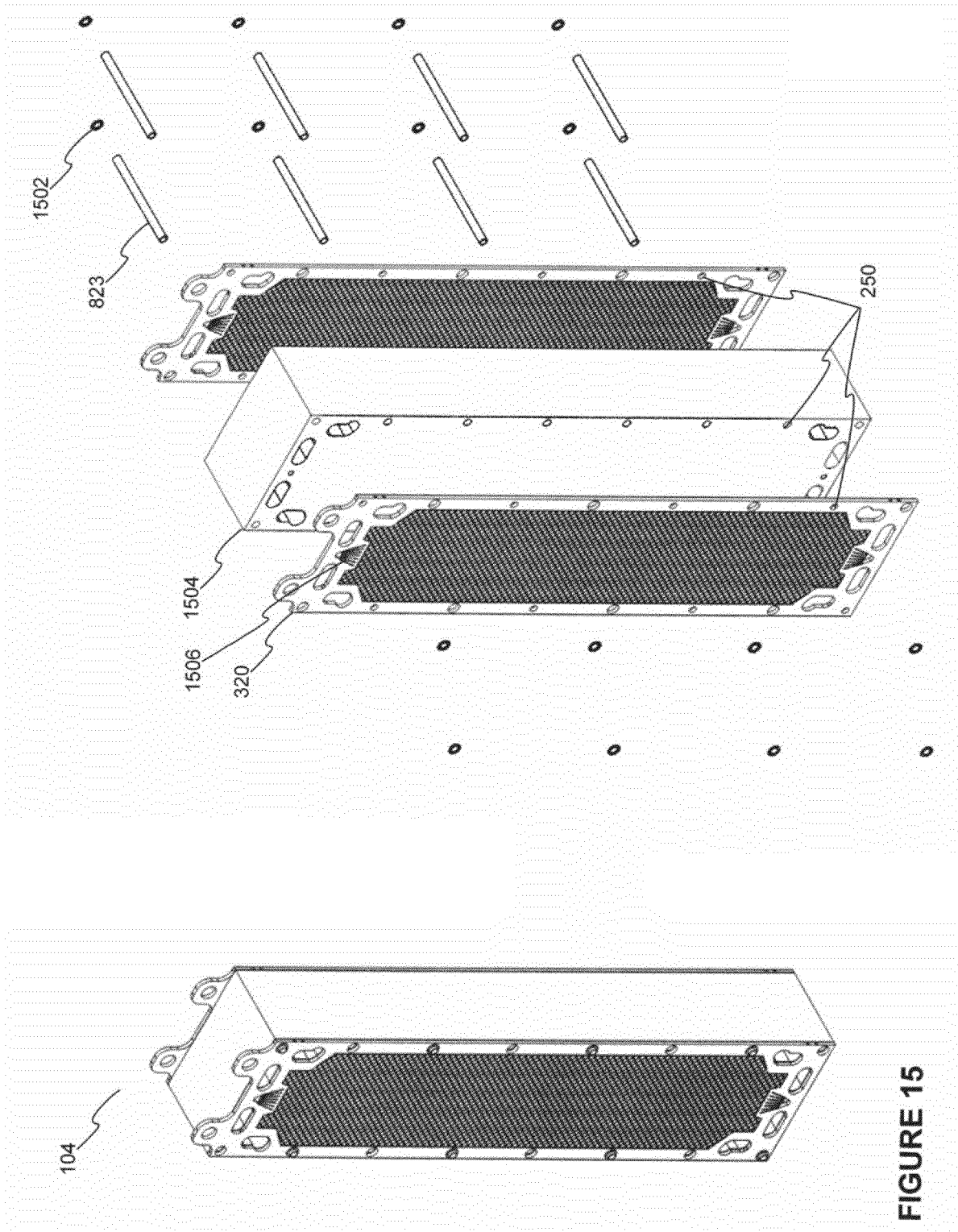

Referring now to FIG. 15, there are shown a perspective view and an exploded view of the internal module 104, according to another embodiment. Central to the internal module 104 is an alternating series of gasket separators and ion exchange membranes 210 ("gasket and membrane assembly 1504") that form one or more of the drive cells, product cells, and completion compartments. Disposed on either end of the internal module 104 are a pair of rigid interior end plates 320 that can be fluidly coupled to the interior end plate 320 of an adjacent one of the internal modules 104. In order to couple adjacent interior end plates 320 together, the peripheries of two of the end plates 320 can be aligned and then compressed together using tensioning equipment, as described in further detail below.

When two of the interior end plates 320 are compressed together in this fashion, they collectively circumscribe the end plate compartment 402 into which the module ion transfer fluid may be pumped. As shown in FIG. 15, each of the module ion transfer fluid inlet and outlet manifolds 140e, 141e are fluidly coupled to the end plate compartment 402 by a series of thin, flared conduits 1506 that converge on and that are each fluidly coupled to the module ion transfer fluid inlet and outlet manifolds 140e, 141e. Beneficially, the flared conduits 1506 facilitate widespread distribution of the module ion transfer fluid within the end plate compartment 402, thereby facilitating a strong ionic current. Additionally, the flared conduits' 1506 relatively thin profile helps to prevent deflection by the adjacent completion compartment gasket separators 209 into them, thereby helping to prevent internal leakage.

Because the interior end plates 320 are rigid, force can be applied directly to them in order to suitably compress the gasket and membrane assembly 1504. For example, force may be applied using a winching device, hydraulics, a jack, tensioning rods, or any other suitable device. As discussed above, the gasket and membrane assembly 1504 and the interior end plates 320 have located around their periphery a series of spaced dowel holes 250 that extend from one end of the internal module 104 to the other. While the gasket separators and ion exchange membranes in the gasket and membrane assembly 1504 are being assembled together, the dowels 823 can be inserted through the spaced dowel holes 250 to ensure that each additional gasket or membrane that is added to the gasket and membrane assembly 1504 is aligned with the gaskets and membranes that have already been added to the assembly 1504. Once the gasket and membrane assembly 1504 has been fully assembled, an external force can be applied to the interior end plates 320 to compress the gasket and membrane assembly 1504. The dowels 823 have threaded ends so that once the gasket and membrane assembly 1504 has been sufficiently compressed, dowel nuts 1502 may be screwed on to the dowels 823 and against the interior end plates 320 to maintain compression of the gasket and membrane assembly 1504 once the external force is removed. For reasons discussed in more detail below, the dowels 823 are also hollow.

Figure 16:
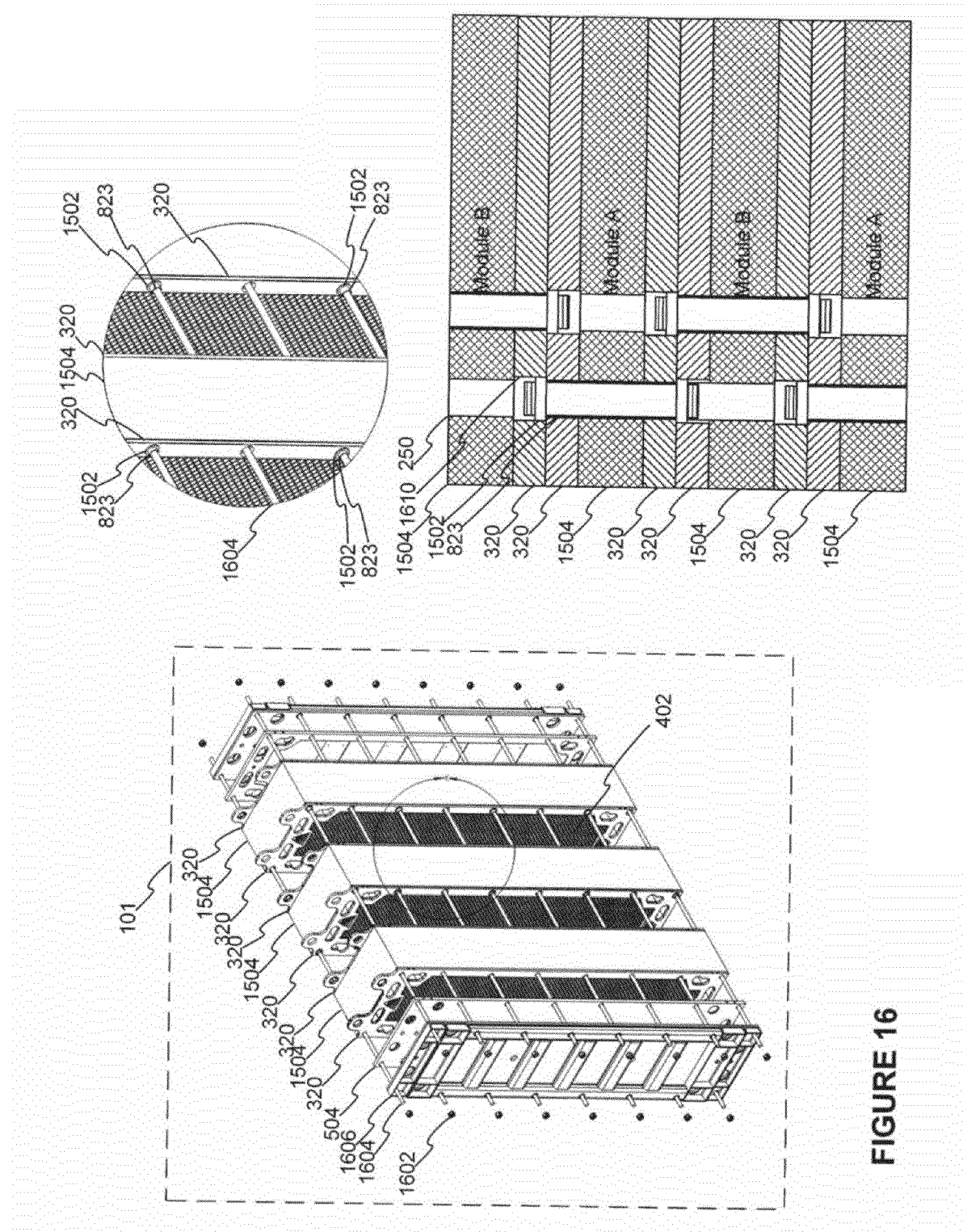
FIG. 16 shows exploded, detailed, and sectional views of another embodiment of the stack composed of internal and end modules.
Figure 17:
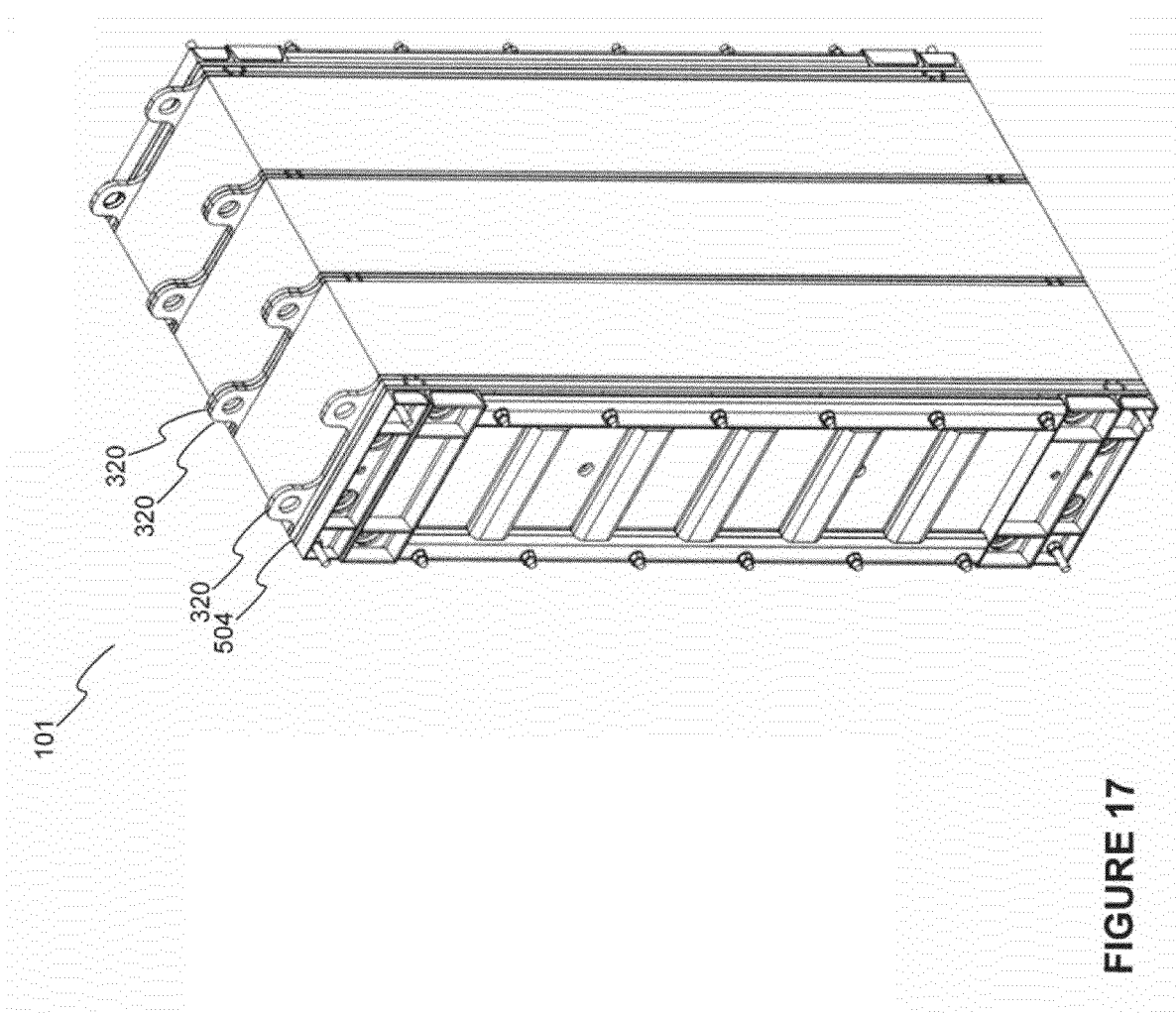
FIG. 17 shows a perspective view of the stack of FIG. 16.

Once several of the internal modules have been assembled and individually compressed, they can be compressed together. One of the views shown in FIG. 16 is a sectional view of four of the internal modules 104 that are aligned back-to-back. In the gasket and membrane assembly 1504 shown in FIG. 16, for any adjacent pair of the internal modules 104 the interior end plates for one of the modules 104 has a first type of end plate 320 and the other of the modules 104 has a second type of end plate 320 that is complementary to the first type of end plate 320. The two types of the end plates 320 are identical except that the first type of end plate 320 has recesses 1610 that are positioned only over the dowel holes 250 and that are sized large enough to receive the dowel nuts 1502 that are attached to the dowels 823 that are inserted through a first subset of the dowel holes 250, while the second type of end plate 320 has the recesses 1610 positioned only over another subset of the dowel holes 250 that is complementary to the first subset of the dowel holes 250.

The recesses 1610 serve two purposes. First, they can be used for alignment: two adjacent end plates 320 will only be mounted flush against each other when then dowel nuts 1502 in one of the end plates 320 is inserted into the recesses 1610 in the other of the end plates 320. The dowel nuts 1502 may be any suitable shape, such as circular, to facilitate alignment. The fact that the recesses 1610 are positioned over complementary sets of the dowel holes 250 in adjacent end plates 320 is beneficial for ensuring that the dowel nuts 1502 are screwed into certain, pre-specified, and correct positions. Second, they are useful because when the stack assembly 101 is compressed using the tensioning frame 1604, which is discussed in more detail below, the dowel nuts 1502 will be pushed from one of the modules 104 into an adjacent one of the modules 104, as compression reduces the length of the gasket and membrane assembly 1504. The recesses 1610 in the end plate 320 of the adjacent one of the modules 104 provide space in which the pushed dowel nuts 1502 can rest, thereby preventing the dowel nut 1502 from detrimentally pushing the internal modules 104 apart. In an alternative embodiment (not shown), the dowel holes 250 may be sized large enough to accept the dowel nuts 1502, and a separate recess in the end plates 320 may not be present.

The cross-sectional view shown in FIG. 16 illustrates the operation of the recesses 1610 and the dowel nuts 1502 when the stack of internal modules 104 is compressed. The modules 104 labelled "Module A" utilize the first type of end plate 320, while the modules 104 labelled "Module B" utilize the second type of end plate 320. The two types of end plates 320 may be rotated 180 degrees relative to each other in order to produce the complementary hole sizes and patterns. The leftmost dowel hole 250 in the topmost module labelled "Module B" has one of the recesses 1610, and the dowel nut 1502 for "Module A" immediately below the topmost "Module B" accordingly slides completely into the end plate 320 for "Module B" until either "Module A" is compressed fully or the dowel nut 1502 contacts the gasket and membrane assembly 1504. Similarly, the "Module A" immediately below the topmost "Module B" receives the dowel nuts 1502 from the "Module B" immediately above and below it.

FIG. 16 also shows exploded and detailed views of the stack assembly 101 being compressed using the tensioning frame 1606 and tensioning rods 1604. The tensioning frame 1606 is constructed using two rectangular frames that are placed over the periphery of the ends of the end modules 106. The tensioning frame 1604 is periodically buttressed with vertically spaced, horizontally extending reinforcing bars (not labelled) that are coplanar with the tensioning frame 1604's rectangular frames. Peripherally spaced in the tensioning frame 1604 along the rectangular frame are a series of dowel holes 250 that align with the dowel holes 250 in the internal and end modules 104, 106. To compress the ends of the stack assembly 101 together after the internal and end modules 104, 106 are aligned, threaded tensioning rods 1604 are inserted through all of the dowel holes 250 in the tensioning frame 1604, from the rectangular frame on one of the ends of the stack assembly 101, through the dowel holes 250 and hollow dowels 823 within the stack, and out the dowel holes 250 in the rectangular frame on the other end of the stack. Tensioning rod nuts 1602 are then threaded on to the tensioning rods 1604 and torqued to a set point in order to achieve a suitable compressive gasket pressure, such as approximately 1.4 MPa in one embodiment, thereby applying an additional compressive force to the stack assembly 101. After the tensioning rod nuts 1602 are screwed such that the compressive force applied to the stack assembly 101 is within appropriate tolerances, the stack assembly 101 shown in FIG. 17 results.

Figure 18:
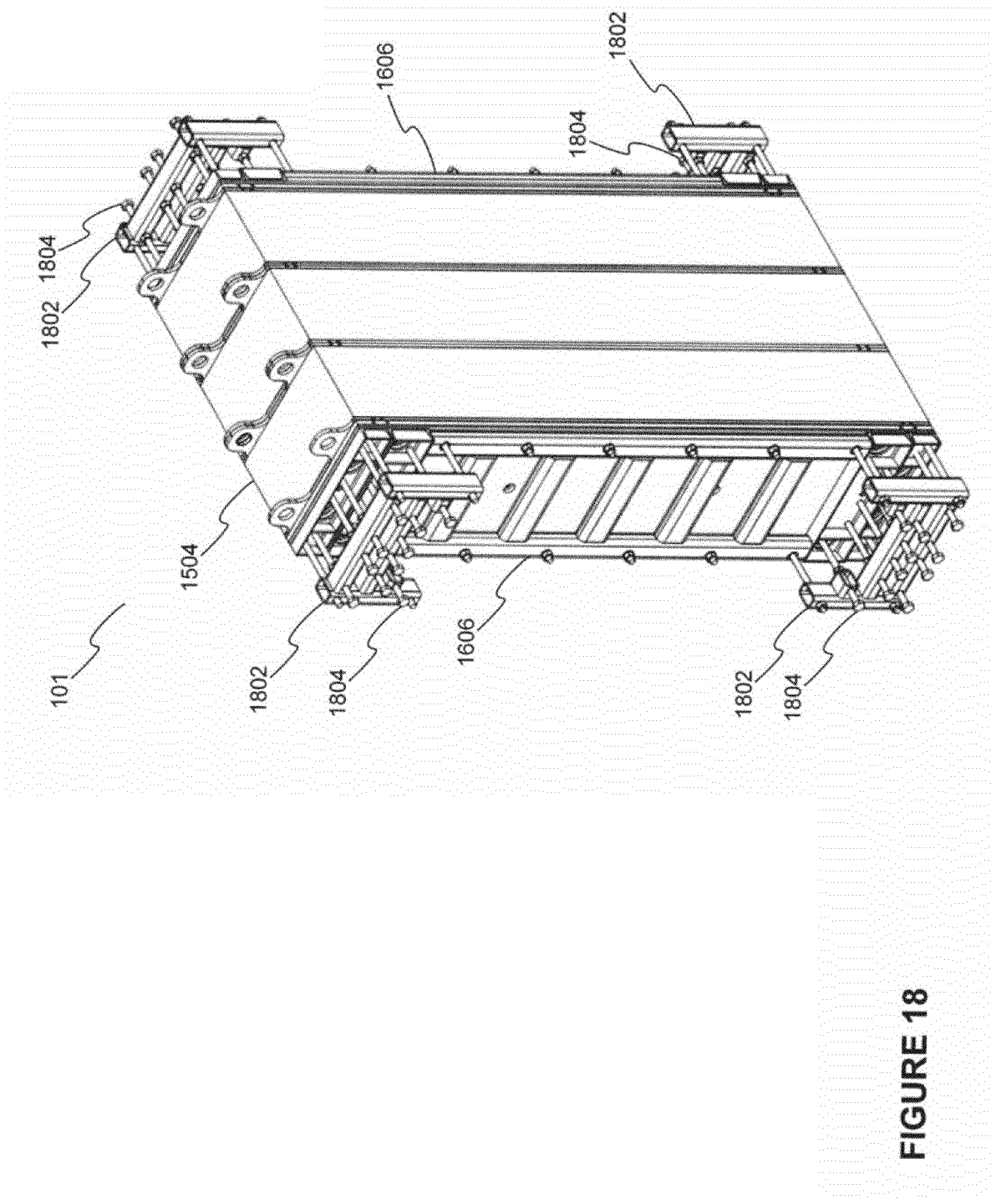
FIG. 18 show a perspective view of a compression device mounted on to the stack of FIG. 16, according to another embodiment.

In order to provide an extra safeguard against leakage, a compression device 1802 such as the one depicted in FIGS. 18 and 19 can be used. While the tensioning frame 1606 and rods 1604 apply compressive force uniformly around the periphery of the stack assembly 101, the compression device 1802 applies compressive force directly to the stack assembly 101 in the vicinity immediately adjacent to the manifolds 140, 141 and the gasket notch zones 1304, 1315, where leakage is more likely to occur.

The compression device 1802 is constructed from two parallel bars that are mounted vertically on to the tensioning frame 1606 over the periphery of the end module 106 ("mounting bars"), and two struts that are mounted between and perpendicular to the vertically mounted, parallel bars. As is clear from FIG. 18, four of the compression devices 1802 are mounted on to the tensioning frame 1606: one pair is mounted over the inlet manifolds 140 in the pair of end modules 106, and one pair is mounted over the outlet manifolds 141 in the pair of end modules 106. Each of the mounting bars for each of the compression devices 1802 includes two of the dowel holes 250 so that the tensioning rods 1604 can still be used to compress the stack assembly 101 even when the compression devices 1802 are mounted to the tensioning frame 1606.

Extending in a direction parallel to the length of the stack assembly 101 are ten different compression members 1804 that are movable into and away from the tensioning frame 1606 of the stack assembly 101 near the four sets of manifolds 150 on the external end plate 504. The ten different compression members 1804 are used to discretely apply force to ten load application points 1806 on the external end plates 504, each of which is marked using an "x" in FIG. 19. As FIG. 19 shows, the load application points 1806 are adjacent to the manifolds 140, 141 used in the stack assembly 101. The compression members 1804 in the embodiment of the compression device 1802 shown in FIG. 19 are threaded bolts that can be screwed into and out of the struts. In alternative embodiments (not depicted), the compression members 1804 may take other forms. For example, they may not be threaded and may instead be secured using a pin and slot system. The compression members may also be hydraulic rams or any other device which is operable to be moved towards and away from the tensioning frame or end plate of the stack assembly and to apply a compressive force thereto. There may also be more or less compression members 1804 with different load application points than those depicted in the embodiment shown.

Beneficially, the compression device 1802 can be used to apply compressive point loads at discrete points nearer to the manifolds 140, 141 and the gasket notch zones 1304, 1315 than the tensioning rods 1604 could. The tensioning rods 1604 cannot be used to apply compressive force as near to the manifolds 140, 141 because the tensioning rods 1604 extend through the length of the entire stack assembly 101, and would therefore pierce the manifolds 140, 141 and result in leakage.

According to another embodiment, the compression device 1802 is used with a stack that is not a modular stack including internal and end modules, for example a stack as disclosed in U.S. Pat. No. 8,137,522 (herein incorporated by reference) or a stack for a filter press or the like. As with the modular stack, the compression device applies compressive force directly to the non-modular stack in the vicinity immediately adjacent to manifolds and gasket notch zones (when present), thereby beneficially providing an extra safeguard against leaks. Referring to FIG. 20, there is shown a stack 2002 which is made up of a pair of rigid end plates 2004 and a plurality of membrane bounded compartments layered between. A tensioning frame 1606, tensioning rods 1604 and tensioning rod nuts 1602 apply compressive force uniformly around the periphery of the stack 2002 as described above with reference to FIG. 16. Four compression devices 1802 are mounted on to the tensioning frame 1606: one pair is mounted over the inlet manifolds (not shown) and one pair is mounted over the outlet manifolds (not shown) of the stack 2002. Compression members 1804 are moved towards the tensioning frame 1606 to apply force at discrete load application points in the vicinity of the manifolds and gasket notch zones if present. The compression members 1804 in the embodiment of the compression device 1802 shown in FIG. 20 are threaded bolts that can be screwed into and out of struts in the compressive device 1802. In alternative embodiments (not depicted), the compression members 1804 may take other forms. For example, they may not be threaded and may instead be secured using a pin and slot system. The compression members may also be hydraulic rams or any other device which is operable to be moved towards and away from the tensioning frame or end plate of the stack assembly and to apply a compressive force thereto. There may also be more or less compression members 1804 with different load application points than those depicted in the embodiment shown.

In addition to, or alternative with the tensioning frame, compression of the stack 2002 may be provided by an adjustable expansion device (not shown) in communication with one or both of the rigid end plates 2004 and adjustable to compress the rigid end plates 2004 towards each other. The adjustable expansion device can include, for example, bolt jacks, hydraulic jacks, turn buckles, or another suitable device that abut one or both of the rigid end plates to apply compressive force to the stack 2002.

Whilst the embodiment described herein are directed at a stack for a saltwater desalination system, the compression device may also be used in other membrane based stacks to minimize or prevents leaks, for example, but not limited to a filter press.

Referring to FIG. 21, there is shown an exploded view of a modular stack assembly 2101 according to another embodiment. The modular stack assembly 2101 includes a plurality of internal modules 2104 in stacked arrangement with a pair of external end plates 504 at either end of the stacked internal modules 2104. A pair of tensioning frames 1606 are positioned on the opposite side of each external end plate 504 to the internal modules 2104. Dowel holes are spaced around the periphery of the internal modules 2104, the external end plates 504 and the tensioning frames 1606, which when aligned form a plurality of dowel conduits. Tensioning rods 1604 are inserted through the dowel conduits and through hollow dowels (not shown) within the internal modules 2104 as is described above with reference to FIG. 16. Tensioning rod nuts 1602 are then threaded on to the tensioning rods 1604 and torqued to a set point in order to achieve a suitable compressive pressure.

The internal modules 2104 are bounded on either side by a pair of rigid interior end plate 2120. Each interior end plate 2120 includes an electrode 2130 mounted in a recess of the interior end plate 2120. The interior end plates 2120 may be made of a rigid plastic to minimize corrosion, minimise leaks and provide electrical insulation to the internal modules 2104. The electrodes 2130 of each pair of interior end plates 2120 are electrically connected to each other to complete an ionic circuit through the internal module 2104. The electrical connection may be in series of parallel as would be understood by a person of skill in the art. Alternatively, the electrodes of some of the internal modules may be connected in series while the electrodes of other internal modules may be connected in parallel or any combination. Electrochemical completion of the ionic circuit is achieved by electrolyte circulating in an electrolyte compartment (not shown) adjacent the internal surface of each rigid interior end plate 2120, such that there is oxidation and reduction reactions of the electrolyte at the electrode 2130. The electrolyte may circulate through the electrolyte chambers in series or in parallel as would be understood by a person of skill in the art. Alternatively, the electrolyte of some of the internal modules may be circulate in series while the electrolyte of other internal modules may circulate in parallel. Provision of an ionic circuit through each internal module 2104 allows for a larger number of internal modules 2104 to be utilized in the modular stack assembly 2101 whilst still maintaining a strong electrochemical reaction within the internal modules 2104. The tensioning frame and/or the external end plates 504 may be made of metal (for example, but not limited to, steel) to provide stiffness to the structure allowing the structure to be compressed. The metal tensioning frame and/or external end plates 504 are isolated from corroding fluid in the internal modules by the plastic interior end plates 2120.

FIG. 22 shows the modular stack assembly 2101 of FIG. 21 fitted with the compression device 1802. Four of the compression devices 1802 are mounted on to the tensioning frame 1606: one pair is mounted over the inlet manifolds 140 in the pair of external end plates 504, and one pair is mounted over the outlet manifolds 141 in the pair of external end plates 504. Compression members 1804 are moved towards the tensioning frame 1606 to apply force at discrete load application points in the vicinity of the manifolds 140, 141 and gasket notch zones. The compression members 1804 in the embodiment of the compression device 1802 shown in FIG. 21 are threaded bolts that can be screwed into and out of struts on the compression device 1802. In alternative embodiments (not depicted), the compression members 1804 may take other forms. For example, they may not be threaded and may instead be secured using a pin and slot system. The compression members may also be hydraulic rams or any other device which is operable to be moved towards and away from the tensioning frame or end plate of the stack assembly and to apply a compressive force thereto. There may also be more or less compression members 1804 with different load application points than those depicted in the embodiment shown.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A compression device comprising:
    a frame operably coupleable to a rigid end plate of a stack; and
    a plurality of compression members moveably connected to the frame and operable to be moved towards and away from the rigid end plate;
    wherein the plurality of compression members are positioned to apply force to the rigid end plate of the stack in the vicinity of fluid manifolds when the compression members are moved towards the rigid end plate.

2. The compression device as claimed in claim 1, wherein the compression members are bolts that can be screwed into and out of struts in the frame.

3. An apparatus comprising:
    a stack comprising:
        a pair of rigid end plates located at opposing ends of the stack;
        a plurality of membrane bounded compartments layered between the pair of rigid end plates; and
        fluid manifolds extending through the membrane bounded compartments; and
    the compression device of claim 1.

4. The apparatus as claimed in claim 3 further comprising:
    a series of holes spaced around the periphery of each of the pair of rigid end plates and the plurality of membranes such that when the pair of rigid end plates and the plurality of membranes are aligned with each other, the holes align to form conduits extending therethrough;
    a plurality of tensioning rods having threaded ends and extending through the conduits; and
    a pair of tensioning rod nuts screwed on to the ends of the tensioning rods to compress the pair of rigid end plates and the plurality of membranes together.

5. The apparatus as claimed in claim 4 further comprising a tensioning frame positioned between the frame and one of the pair of rigid end plates, wherein the tensioning frame comprises holes aligned with the holes in said one of the pair of rigid end plates and wherein the tensioning rods also extend through the holes in the tensioning frame and the tensioning rod nuts compress the tensioning frame against said one of the rigid end plates.

6. The apparatus as claimed in claim 4, wherein the frame comprises holes aligned with holes in the pair of rigid end plates; and wherein the tensioning rods also extend through the holes in the frame and the tensioning rod nuts fixedly couples the frame to the rigid end plate.

7. The apparatus as claimed in claim 4, wherein a subset of the plurality of tensioning rods extend through the holes in the frame and are longer than additional tensioning rods which do not extend through the frame.

8. The apparatus as claimed in claim 3 further comprising an adjustable expansion device in communication with one or both of the pair of rigid end plates and adjustable to compress the rigid end plates towards each other.

9. The apparatus as claimed in claim 3, wherein the plurality of compression members are bolts that can be screwed into and out of struts in the frame.

10. The apparatus as claimed in claim 3 further comprising another compression device, thus having a first and a second compression device;

wherein the frame of the first compression device is fixedly coupled to one of the pair of rigid end plates; and wherein the frame of the second compression device is fixedly coupled to the other of the pair of rigid end plates.

11. The apparatus as claimed in claim 3, wherein the fluid manifolds comprise outlet fluid manifolds and inlet fluid manifolds; and wherein the apparatus comprises a pair of compression devices positioned such that the plurality of compression members of one of the pair of compression devices apply force to the rigid end plate in the vicinity of the outlet fluid manifolds and the plurality of compression members of the other of the pair of compression devices apply force to the rigid end plate in the vicinity of the inlet fluid manifolds.

12. The apparatus as claimed in claim 3, wherein the fluid manifolds comprise outlet fluid manifolds and inlet fluid manifolds;

wherein the apparatus comprises a first pair of compression devices and a second pair of compression devices; and wherein the frames of the first pair of compression devices are fixedly coupled to one of the pair of rigid end plates and the frames of the second pair of compression devices are fixedly coupled to the other of the pair of rigid end plates and the plurality of compression members of one of the first and second pair of compression devices are positioned to apply force in the vicinity of the outlet fluid manifolds and the plurality of compression members of the other of the first and second pair of compression devices are positioned to apply force in the vicinity of the inlet fluid manifolds.

* * * * *